US012624172B2

(12) United States Patent
Tansho et al.

(10) Patent No.: US 12,624,172 B2
(45) Date of Patent: May 12, 2026

(54) METHOD FOR PRODUCING WETTING AGENT FOR SEMICONDUCTOR, CONTAINING POLYVINYL ALCOHOL COMPOSITION, POLISHING COMPOSITION CONTAINING WETTING AGENT FOR SEMICONDUCTOR, OBTAINED BY THE PRODUCTION METHOD, AND METHOD FOR PRODUCING POLISHING COMPOSITION

(71) Applicant: FUJIMI INCORPORATED, Kiyosu (JP)

(72) Inventors: Hisanori Tansho, Kiyosu (JP); Kohsuke Tsuchiya, Kiyosu (JP); Hiroki Yamaguchi, Kiyosu (JP); Reiko Akizuki, Kiyosu (JP); Ryunosuke Ando, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 396 days.

(21) Appl. No.: 18/028,920

(22) PCT Filed: Jun. 9, 2021

(86) PCT No.: PCT/JP2021/021894
§ 371 (c)(1),
(2) Date: Mar. 28, 2023

(87) PCT Pub. No.: WO2022/070516
PCT Pub. Date: Apr. 7, 2022

(65) Prior Publication Data
US 2023/0331930 A1      Oct. 19, 2023

(30) Foreign Application Priority Data

Sep. 30, 2020     (JP) ................................. 2020-164901

(51) Int. Cl.
*C08J 3/07* (2006.01)
*C09G 1/02* (2006.01)

(52) U.S. Cl.
CPC ....... *C08J 3/07* (2013.01); *C09G 1/02* (2013.01); *C08J 2329/04* (2013.01)

(58) Field of Classification Search
CPC ........... C08J 3/07; C08J 2329/04; C09G 1/02; C09G 1/04; C08L 29/04; C09K 3/00; C09K 3/14; C09K 3/1463; H01L 21/304
See application file for complete search history.

(56) References Cited

U.S. PATENT DOCUMENTS 10,351,732 B2 *   7/2019   Ichitsubo .............. C08F 216/06
2009/0298393 A1   12/2009   Kozasa
(Continued)

FOREIGN PATENT DOCUMENTS

CN          102666014 A      3/2006
CN            1996506 A      7/2007
(Continued)

OTHER PUBLICATIONS

JP 2014233707 A_Machine Translation (Year: 2014).*
(Continued)

*Primary Examiner* — Amber R Orlando
*Assistant Examiner* — Anastasia A. Kuvayskaya
(74) *Attorney, Agent, or Firm* — Foley & Lardner LLP

(57) ABSTRACT

To provide a polyvinyl alcohol composition effectively suppressed in generation of an aggregated product, in a method for producing a wetting agent for a semiconductor, containing a polyvinyl alcohol composition.
A method for producing a wetting agent for a semiconductor, containing a polyvinyl alcohol composition, wherein the polyvinyl alcohol composition is obtained through an addition-in-liquid step of adding into the inside of any one (Continued)

solution of a first liquid containing polyvinyl alcohol and water and a second liquid other than the first liquid, the other liquid of the first liquid and the second liquid.

15 Claims, 1 Drawing Sheet

(56) References Cited

U.S. PATENT DOCUMENTS

| | | | |
|---|---|---|---|
| 2010/0003821 A1* | 1/2010 | Morinaga | H01L 21/02052 |
| | | | 438/692 |
| 2012/0322265 A1 | 12/2012 | Hsu et al. | |
| 2012/0322346 A1 | 12/2012 | Iwano et al. | |
| 2020/0306922 A1 | 10/2020 | Matsuda | |

FOREIGN PATENT DOCUMENTS

| | | | | | |
|---|---|---|---|---|---|
| CN | 110335837 | A | * 10/2019 | | H01L 21/67046 |
| CN | 110800085 | A | 2/2020 | | |
| JP | H11-128816 | A | 5/1999 | | |
| JP | 2004-136492 | A | 5/2004 | | |
| JP | 2007-319948 | A | 12/2007 | | |
| JP | 2009-290139 | A | 12/2009 | | |
| JP | 2010-034509 | A | 2/2010 | | |
| JP | 2014233707 | A | * 12/2014 | | B01F 15/04 |
| JP | 2016-115822 | A | 6/2016 | | |
| JP | 2019-094431 | A | 6/2019 | | |
| KR | 10-2010-0004874 | A | 1/2010 | | |
| KR | 10-2019-0103422 | A | 9/2019 | | |
| TW | 201520233 | A | 6/2015 | | |
| WO | WO-2019/077687 | A1 | 4/2019 | | |

OTHER PUBLICATIONS

CN 110335837 A_Machine Translation (Year: 2019).*
C_PVA_Solutions by Silverson (Year: 2016).*
Japanese Office Action Issued in corresponding JP Application No. 2020-164901 Dated Feb. 25, 2025 (6 pages).
International Search Report and Written Opinion from PCT Appl. Ser. No. PCT/JP2021/021894 mailed Jul. 27, 2021, with partial English translation (13 pages).
Chinese Office Action issued in corresponding CN Application No. 202180065497.3 Dated Apr. 22, 2025 (29 pages).
Taiwanese Office Action issued in corresponding Taiwanese Patent Application No. 110123071 Dated Apr. 7, 2025 (20 pages).
Japanese Office Action issued in corresponding Japanese Patent Application No. 2020-164901 Dated Sep. 10, 2024 (6 pages).
Taiwanese Office Action issued in corresponding Taiwanese Patent Application No. 11320961390 Dated Sep. 19, 2024 (26 pages).
KR Office Action on KR Appl. No. 10-2023-7009966 dated Nov. 3, 2025.
Chinese Second Office Action issued in corresponding CN Application No. 202180065497.3 dated Mar. 8, 2026 (21 pages).

* cited by examiner

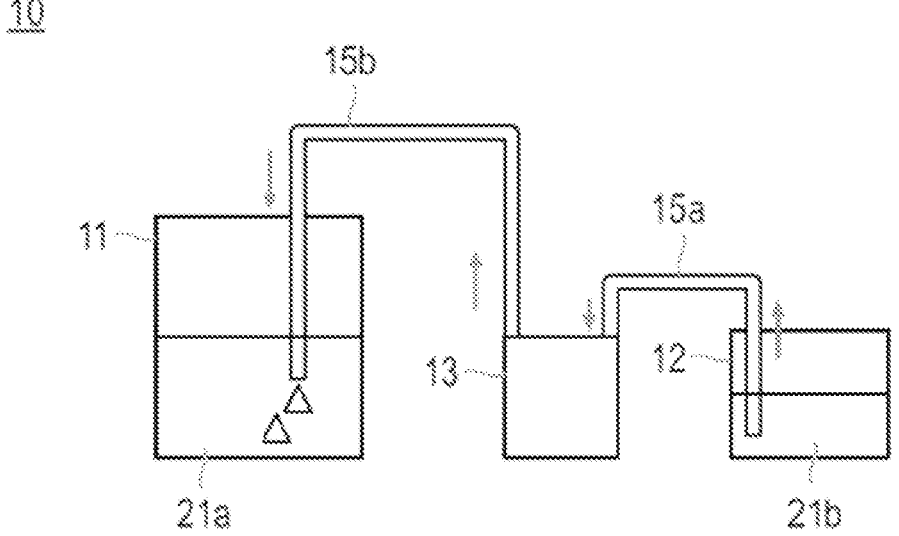

METHOD FOR PRODUCING WETTING AGENT FOR SEMICONDUCTOR, CONTAINING POLYVINYL ALCOHOL COMPOSITION, POLISHING COMPOSITION CONTAINING WETTING AGENT FOR SEMICONDUCTOR, OBTAINED BY THE PRODUCTION METHOD, AND METHOD FOR PRODUCING POLISHING COMPOSITION

TECHNICAL FIELD

The present invention relates to: a method for producing a wetting agent for a semiconductor, containing a polyvinyl alcohol composition; a polishing composition containing a wetting agent for a semiconductor, obtained by the production method; and a method for producing a polishing composition.

BACKGROUND ART

Polyvinyl alcohol is a hydrophilic synthetic resin, and is often used as, for example, a fibrous raw material, a paste, paint, an adhesive, or an emulsifier, in the form of a fluent solution (aqueous solution).

In general, polyvinyl alcohol can be dissolved in water by dispersing it in water and then agitating it at a high temperature (e.g., 80° C. or higher). However, it is known to generate agglomerates (lumps) when dissolved without being dispersed in water. The reason for generation of an agglomerate is considered because surfaces of polyvinyl alcohol particles, in contact with water, are swollen and semi-dissolved and such polyvinyl alcohol particles semi-dissolved coalesce to each other to thereby form a large agglomerate. Such an agglomerate is in the state where only surface portions of the agglomerate are dissolved and no water penetrates into the interior of the agglomerate at all, and the agglomerate is extremely difficult to dissolve in a solvent. Therefore, an aqueous polyvinyl alcohol solution containing an agglomerate has the problem of being hardly applied in various applications.

Various methods for producing an aqueous polyvinyl alcohol solution have been proposed in order to solve the above problems. For example, Patent Literature 1 discloses a method for enhancing dispersibility and solubility of polyvinyl alcohol by allowing a surfactant to be contained in the polyvinyl alcohol.

CITATION LIST

Patent Literature

Patent Literature 1: Japanese Patent Laid-Open No. 2019-94431

SUMMARY OF INVENTION

Technical Problem

However, it has been found that, even if an aqueous polyvinyl alcohol solution with no agglomerate is obtained, other aqueous solution is added to the aqueous polyvinyl alcohol solution to thereby cause an aggregate to be generated. For example, in a case where such an aqueous polyvinyl alcohol solution is applied to a wetting agent for a semiconductor or a polishing composition, a solid of an aggregate or the like scratches an object to be polished, and thus it is necessary to remove the solid by filtration or the like in advance. An aqueous polyvinyl alcohol solution with an aggregate is very inferior in filtration ability, thereby resulting in a remarkable reduction in productivity, for example, time-consuming for filtration, and/or a reduction in yield.

An object of the present invention is then to provide a polyvinyl alcohol composition effectively suppressed in generation of an aggregate, in a method for producing a wetting agent for a semiconductor, containing a polyvinyl alcohol composition (aqueous polyvinyl alcohol solution).

Solution to Problem

The present inventors have made intensive studies in order to solve the above new problems. As a result, the inventors have found that the problems can be solved by a method for producing a wetting agent for a semiconductor and/or a polishing composition, the method being a method for producing a wetting agent for a semiconductor and/or a polishing composition, which contains a polyvinyl alcohol composition, wherein the polyvinyl alcohol composition is obtained through an addition-in-liquid step of adding into the inside of any one liquid of a first liquid containing polyvinyl alcohol and water and a second liquid other than the first liquid, the other liquid of the first liquid and the second liquid, and thus have completed the present invention.

Effect of the Invention

According to the present invention, there is provided a polyvinyl alcohol composition effectively suppressed in generation of an aggregate, in a method for producing a wetting agent for a semiconductor and/or a polishing composition, which contains a polyvinyl alcohol composition.

BRIEF DESCRIPTION OF DRAWING

FIG. 1 A view schematically illustrating an apparatus used in an experiment of addition-in-liquid.

DESCRIPTION OF EMBODIMENTS

The present invention relates to a method for producing a wetting agent for a semiconductor, the method being a method for producing a wetting agent for a semiconductor and/or a polishing composition, which contains a polyvinyl alcohol composition, wherein the polyvinyl alcohol composition is obtained through an addition-in-liquid step of adding into the inside of any one solution of a first liquid containing polyvinyl alcohol and water and a second liquid other than the first liquid, the other liquid of the first liquid and the second liquid. A wetting agent for a semiconductor and/or a polishing composition, which contains a polyvinyl alcohol composition, obtained by such a production method, is suppressed in generation of an aggregate and is excellent in filtration ability. According to one embodiment, a wetting agent for a semiconductor and/or a polishing composition, which contains a polyvinyl alcohol composition, obtained by such a production method, has excellent storage stability.

A mechanism for obtaining such an effect is considered as follows. It is noted that the following mechanism is merely presumed and the scope of the present invention is not limited based on the mechanism. In the production method of the present invention, the second liquid is added into the inside of the first liquid containing polyvinyl alcohol, or the first liquid containing polyvinyl alcohol is added into the inside of the second liquid. It is considered that thus bubbles generated on a liquid surface during liquid addition can be suppressed and generation of an aggregate due to a dried product of the bubbles can be suppressed.

The addition-in-liquid means that other liquid is directly added to into the inside of one liquid, and, for example, corresponds to a mode where a supply pipe or the like is introduced into the inside of one liquid and other liquid is supplied into such one liquid through a supply pipe. The mode of addition-in-liquid may be a method capable of directly addition not onto a liquid surface, but into the inside of a liquid, and is not limited to the above mode.

Hereinafter, embodiments of the present invention are described. The present invention is not limited only to the following embodiments. Herein, the "X-Y" representing the range means "X or more and Y or less", and the "weight", the "% by weight" and the "parts by weight" are respectively handled as synonymous terms with the "mass", and the "% by mass" and the "parts by mass".

Additionally, operations, and measurement of physical properties and the like are performed under conditions of room temperature (20° C. or more 25° C. or less)/a relative humidity of 40% RH or more and 50% RH or less, unless particularly noted.

<<Method for Producing Polyvinyl Alcohol Composition>>

First, a method for producing a polyvinyl alcohol composition for use in a wetting agent for a semiconductor and/or a polishing composition, in the present invention, is described. The method for producing a polyvinyl alcohol composition, here noted, can be applied, as it is, for the method for producing a wetting agent for a semiconductor and/or a polishing composition, of the present invention. In other words, in a case where a polyvinyl alcohol composition contains no abrasive in the present invention, the method for producing a polyvinyl alcohol composition can be applied as a method for producing a wetting agent for a semiconductor, containing a polyvinyl alcohol composition. The polyvinyl alcohol composition can also be used, as it is, as a wetting agent for a semiconductor. In a case where a polyvinyl alcohol composition contains an abrasive in the present invention, the method for producing a polyvinyl alcohol composition can be applied as a method for producing a polishing composition containing a polyvinyl alcohol composition. The polyvinyl alcohol composition can also be used, as it is, as a polishing composition. Therefore, according to one embodiment of the present invention, the method for producing a wetting agent for a semiconductor and/or a polishing composition, which contains a polyvinyl alcohol composition, can also be rephrased as "method for producing a wetting agent for a semiconductor and/or a polishing composition, which contains polyvinyl alcohol".

The polyvinyl alcohol composition in the present invention is obtained in a mixing step of mixing a first liquid containing polyvinyl alcohol and water, and a second liquid other than the first liquid to thereby obtain a polyvinyl alcohol composition, the step including an addition-in-liquid step of adding into the inside of any one liquid of the first liquid and the second liquid, the other liquid of the first liquid and the second liquid.

[First Liquid]

The first liquid contains polyvinyl alcohol and water. The first liquid may further contain, if necessary, any known additive such as a surfactant, a water-soluble polymer other than polyvinyl alcohol, a chelating agent, an organic acid, an organic acid salt, an inorganic acid, an inorganic acid salt, a pH adjusting agent, an oxidant, a metal anticorrosive, an antiseptic agent, and an antifungal agent, as well as a solvent other than water.

(Polyvinyl Alcohol)

The polyvinyl alcohol in the present invention may contain only a vinyl alcohol unit (hereinafter, also referred to as "VA unit") as a repeating unit, or may contain, in addition to the VA unit, a repeating unit other than the VA unit (hereinafter, also referred to as "non-VA unit"). The vinyl alcohol unit is a structural moiety represented by chemical formula: $-CH_2-CH(OH)-$. The polyvinyl alcohol may be a random copolymer, a block copolymer, an alternate copolymer or a graft copolymer containing the VA unit and the non-VA unit. The polyvinyl alcohol may contain only one kind of the non-VA unit, or may contain two or more kinds of the non-VA units.

The polyvinyl alcohol may be polyvinyl alcohol not modified (non-modified PVA), or may be a modified polyvinyl alcohol (modified PVA). Herein, the non-modified PVA refers to polyvinyl alcohol which is produced by hydrolysis (saponification) of polyvinyl acetate and which does not substantially contain a repeating unit ($-CH_2-CH(OCOCH_3)-$) as a structure obtained by polymerization of vinyl acetate and the VA unit.

The degree of saponification of the non-modified PVA may be preferably 70% by mol or more, more preferably 80% by mol or more, further preferably 90% by mol or more. The degree of saponification of the non-modified PVA is preferably 95% by mol or more, more preferably 98% by mol or more, further preferably 99.3% or more particularly in an application of a polishing composition. Therefore, according to one embodiment of the present invention, the non-modified PVA, which has a degree of saponification of 95% by mol or more (preferably 98% by mol or more, more preferably 99.3% by mol or more), can be preferably used. PVA with high saponification tends to easily generate an agglomerate, and thus the present invention can be suitably used in such PVA. The degree of saponification is herein a value obtained by measurement according to JIS-K6726 (1994). Specifically, the degree of saponification means the proportion of an acetoxy group ($-OCOCH_3$) converted into a hydroxy group ($-OH$), in polyvinyl acetate, and is specifically represented by the percentage of the number of hydroxy groups to the total number of acetoxy groups and hydroxy groups in polyvinyl alcohol.

Examples of the non-VA unit which can be contained in the modified PVA include a repeating unit derived from an N-vinyl-type monomer or an N-(meth)acryloyl-type monomer described below, a repeating unit derived from ethylene, a repeating unit derived from an alkyl vinyl ether, and a repeating unit derived from a vinyl ester of a monocarboxylic acid having 3 or more carbon atoms, but not limited thereto. One suitable example of the N-vinyl-type monomer is N-vinylpyrrolidone. One suitable example of the N-(meth)acryloyl-type monomer is N-(meth)acryloylmorpholine. Examples of the alkyl vinyl ether can include vinyl ethers each having an alkyl group having 1 or more and 10 or less carbon atoms, such as propyl vinyl ether, butyl vinyl ether, and 2-ethylhexyl vinyl ether. The vinyl ester of a monocarboxylic acid having 3 or more carbon atoms can be, for example, a vinyl ester of a monocarboxylic acid having 3 or more and 7 or less carbon atoms, such as vinyl propanoate, vinyl butanoate, vinyl pentanoate, or vinyl hexanoate.

The polyvinyl alcohol may be a modified PVA where the VA unit contained in the polyvinyl alcohol is partially acetalized by aldehyde. The aldehyde preferably used can be, for example, an alkylaldehyde, and is preferably an alkylaldehyde having an alkyl group having 1 or more and 7 or less carbon atoms, in particular, preferably acetaldehyde, n-propylaldehyde, n-butylaldehyde, or n-pentylaldehyde. The polyvinyl alcohol here used may be a cation-modified polyvinyl alcohol into which a cationic group such as a quaternary ammonium structure is introduced. Examples of the cation-modified polyvinyl alcohol include those into which a cationic group derived from a monomer having the cationic group, such as a diallyldialkylammonium salt and an N-(meth)acryloylaminoalkyl-N,N,N-trialkylammonium salt, is introduced.

The polyvinyl alcohol may be a modified PVA containing the VA unit, and a non-VA unit having at least one structure selected from an oxyalkylene group, a carboxy group, a sulfo group, an amino group, a hydroxy group, an amide group, an imide group, a nitrile group, an ether group, an ester group, and a salt thereof.

The proportion of the molar number of the VA unit in the molar number of the entire repeating unit constituting the polyvinyl alcohol may be, for example, 5% or more, may be 10% or more, may be 20% or more, or may be 30% or more. In some aspects, the proportion of the molar number of the VA unit is not particularly limited, and may be 50% or more, may be 65% or more, may be 75% or more, may be 80% or more, or may be 90% or more (for example, 95% or more, or 98% or more). Substantially 100% of the repeating unit constituting the polyvinyl alcohol may correspond to the VA unit. The "substantially 100%" here means that at least no non-VA unit is intendedly contained in the polyvinyl alcohol, and encompasses a case where the proportion of the molar number of the non-VA unit in the molar number of the entire repeating unit is typically less than 2% (for example, less than 1%), or 0%. In other some aspects, the proportion of the molar number of the VA unit in the molar number of the entire repeating unit constituting the polyvinyl alcohol may be, for example, 95% or less, may be 90% or less, may be 80% or less, or may be 70% or less.

The content (content on a mass basis) of the VA unit in the polyvinyl alcohol may be, for example, 5% by mass or more, may be 10% by mass or more, may be 20% by mass or more, or may be 30% by mass or more. In some aspects, the content of the VA unit is not particularly limited, and may be 50% by mass or more (for example, more than 50% by mass), may be 70% by mass or more, or may be 80% by mass or more (for example, 90% by mass or more, or 95% by mass or more, or 98% by mass or more). Substantially 100% by mass of the repeating unit constituting the polyvinyl alcohol may correspond to the VA unit. The "substantially 100% by mass" here means that at least no non-VA unit is intendedly contained as the repeating unit constituting the polyvinyl alcohol, and typically means that the content of the non-VA unit in the polyvinyl alcohol is less than 2% by mass (for example, less than 1% by mass). In other some aspects, the content of the VA unit in the polyvinyl alcohol may be, for example, 95% by mass or less, may be 90% by mass or less, may be 80% by mass or less, or may be 70% by mass or less.

The polyvinyl alcohol may contain a plurality of polymer chains different in content of the VA unit, in the same molecule. The polymer chains here each refer to a moiety (segment) constituting a portion of one molecule polymer. For example, the polyvinyl alcohol may contain a polymer chain A where the content of the VA unit is more than 50% by mass, and a polymer chain B where the content of the VA unit is less than 50% by mass (namely, the content of the non-VA unit is more than 50% by mass), in the same molecule.

The polymer chain A may contain only the VA unit as the repeating unit, or may contain, in addition to the VA unit, the non-VA unit. The content of the VA unit in the polymer chain A may be 60% by mass or more, may be 70% by mass or more, may be 80% by mass or more, or may be 90% by mass or more. In some aspects, the content of the VA unit in the polymer chain A may be 95% by mass or more, or may be 98% by mass or more. Substantially 100% by mass of the repeating unit constituting the polymer chain A may correspond to the VA unit.

The polymer chain B may contain only the non-VA unit as the repeating unit, or may contain, in addition to the non-VA unit, the VA unit. The content of the non-VA unit in the polymer chain B may be 60% by mass or more, may be 70% by mass or more, may be 80% by mass or more, or may be 90% by mass or more. In some aspects, the content of the non-VA unit in the polymer chain B may be 95% by mass or more, or may be 98% by mass or more. Substantially 100% by mass of the repeating unit constituting the polymer chain B may correspond to the non-VA unit.

Examples of the polyvinyl alcohol containing the polymer chain A and the polymer chain B in the same molecule include a block copolymer and a graft copolymer each containing these polymer chains. The graft copolymer may be a graft copolymer having a structure where the polymer chain B (side chain) is grafted to the polymer chain A (main chain), or may be a graft copolymer having a structure where the polymer chain A (side chain) is grafted to the polymer chain B (main chain). In one aspect, the polyvinyl alcohol, which has a structure where the polymer chain B is grafted to the polymer chain A, can be used.

Examples of the polymer chain B include a polymer chain having a repeating unit derived from an N-vinyl-type monomer, as a main repeating unit, a polymer chain having a repeating unit derived from an N-(meth)acryloyl-type monomer, as a main repeating unit, and a polymer chain having an oxyalkylene unit as a main repeating unit. The main repeating unit herein refers to a repeating unit contained at a proportion of more than 50% by mass, unless particularly noted.

One suitable example of the polymer chain B is a polymer chain having an N-vinyl-type monomer as a main repeating unit, namely, an N-vinyl-based polymer chain. The content of the repeating unit derived from an N-vinyl-type monomer in the N-vinyl-based polymer chain is typically more than 50% by mass, and may be 70% by mass or more, may be 85% by mass or more, or may be 95% by mass or more. Substantially the whole of the polymer chain B may correspond to the repeating unit derived from an N-vinyl-type monomer.

Examples of the N-vinyl-type monomer herein include a monomer having a nitrogen-containing heterocyclic ring (for example, lactam ring), and N-vinyl linear amide. Specific examples of the N-vinyl lactam-type monomer include N-vinylpyrrolidone, N-vinylpiperidone, N-vinylmorpholinone, N-vinyl caprolactam, N-vinyl-1,3-oxazin-2-one, and N-vinyl-3,5-morpholinedione. Specific examples of the N-vinyl linear amide include N-vinylacetamide, N-vinylpropionic acid amide, and N-vinylbutyric acid amide. The polymer chain B can be, for example, an N-vinyl-based polymer chain where more than 50% by mass (for example, 70% by mass or more, or 85% by mass or more, or 95% by mass or more) of the repeating unit corresponds to an N-vinylpyrrolidone unit. Substantially the whole of the repeating unit constituting the polymer chain B may correspond to the N-vinylpyrrolidone unit.

Other examples of the polymer chain B include a polymer chain having a repeating unit derived from an N-(meth)acryloyl-type monomer, as a main repeating unit, namely, an N-(meth)acryloyl-based polymer chain. The content of the repeating unit derived from an N-(meth)acryloyl-type monomer in the N-(meth)acryloyl-based polymer chain is typically more than 50% by mass, and may be 70% by mass or more, may be 85% by mass or more, or may be 95% by mass or more. Substantially the whole of the polymer chain B may correspond to the repeating unit derived from an N-(meth)acryloyl-type monomer.

Examples of the N-(meth)acryloyl-type monomer herein include a linear amide having an N-(meth)acryloyl group and a cyclic amide having an N-(meth)acryloyl group. Examples of the linear amide having an N-(meth)acryloyl group include (meth)acrylamide; N-alkyl(meth)acrylamides such as N-methyl(meth)acrylamide, N-ethyl(meth)acrylamide, N-propyl(meth)acrylamide, N-isopropyl(meth)acrylamide and N-n-butyl(meth)acrylamide; and N,N-dialkyl(meth)acrylamides such as N,N-dimethyl(meth)acrylamide, N,N-diethyl(meth)acrylamide, N,N-dipropyl(meth)acrylamide, N,N-diisopropyl(meth)acrylamide and N,N-di(n-butyl)(meth)acrylamide. Examples of the cyclic amide having an N-(meth)acryloyl group include N-(meth)acryloylmorpholine and N-(meth)acryloylpyrrolidine.

Other examples of the polymer chain B include a polymer chain containing an oxyalkylene unit as a main repeating unit, namely, an oxyalkylene-based polymer chain. The content of the oxyalkylene unit in the oxyalkylene-based polymer chain is typically more than 50% by mass, and may be 70% by mass or more, may be 85% by mass or more, or may be 95% by mass or more. Substantially the whole of the repeating unit contained in the polymer chain B may correspond to the oxyalkylene unit.

Examples of the oxyalkylene unit include an oxyethylene unit, an oxypropylene unit, and an oxybutylene unit. These oxyalkylene units can be respective repeating units derived from corresponding alkylene oxides. The oxyalkylene-based polymer chain may contain one or more such oxyalkylene units. For example, the oxyalkylene-based polymer chain may contain an oxyethylene unit and an oxypropylene unit in combination. When the oxyalkylene-based polymer chain contains two or more such oxyalkylene units, such oxyalkylene units may be in the form of a random copolymer, a block copolymer, an alternate copolymer, or a graft copolymer of corresponding alkylene oxides.

Other examples of the polymer chain B include a polymer chain containing, for example, an alkyl vinyl ether unit, or a constituent unit obtained by acetalization of polyvinyl alcohol and aldehyde, as a main repeating unit. In particular, such a main repeating unit is preferably selected from the group consisting of a vinyl ether unit (alkyl vinyl ether unit) having an alkyl group having 1 or more and 10 or less carbon atoms, a vinyl ester unit (monocarboxylic acid vinyl ester unit) derived from a monocarboxylic acid having 1 or more and 7 or less carbon atoms, and a constituent unit obtained by acetalization of polyvinyl alcohol and an aldehyde having an alkyl group having 1 or more and 7 or less carbon atoms.

Examples of the vinyl ether unit having an alkyl group having 1 or more and 10 or less carbon atoms include a propyl vinyl ether unit, a butyl vinyl ether unit, and a 2-ethylhexyl vinyl ether unit. Examples of the vinyl ester unit derived from a monocarboxylic acid having 1 or more and 7 or less carbon atoms include a vinyl propanoate unit, a vinyl butanoate unit, a vinyl pentanoate unit, and a vinyl hexanoate unit.

The polyvinyl alcohol for use in the polishing composition and/or the wetting agent for a semiconductor disclosed herein is preferably a PVA not modified (non-modified PVA).

The weight average molecular weight (Mw) of the polyvinyl alcohol is not particularly limited. The Mw of the polyvinyl alcohol is usually $2 \times 10^3$ or more, and may be $5 \times 10^3$ or more or may be $1 \times 10^4$ or more. As the Mw of the polyvinyl alcohol is increased, wettability of a surface after polishing and/or rinsing tends to be enhanced. When the Mw of the polyvinyl alcohol is increased, dispersibility of the polyvinyl alcohol tends to be reduced, and thus significance of application of the present invention is enhanced. The Mw of the polyvinyl alcohol is preferably $3 \times 10^4$ or more, more preferably $4 \times 10^4$ or more, further preferably $5 \times 10^4$ or more, particularly preferably $6 \times 10^4$ or more (for example, $6.5 \times 10^4$ or more), from the above viewpoints.

The weight average molecular weight (Mw) of the polyvinyl alcohol is usually appropriately $100 \times 10^4$ or less, preferably $30 \times 10^4$ or less, $20 \times 10^4$ or less (for example, $15 \times 10^4$ or less). The Mw of the polyvinyl alcohol may be $10 \times 10^4$ or less, or may be $8 \times 10^4$ or less from the viewpoint of allowing both the polishing rate and surface protection of a substrate to be satisfied.

The weight average molecular weight (Mw) is herein a value (aqueous, in terms of polyethylene oxide) based on aqueous gel permeation chromatography (GPC). The GPC measurement apparatus here used can be model name "HLC-8320GPC" manufactured by Tosoh Corporation. Measurement conditions are, for example, as follows.

[GPC Measurement Conditions]

Sample concentration: 0.1% by mass
Column: TSKgel GMPWXL
Detector: differential refractometer
Eluent: 100 mM sodium nitrate aqueous solution/acetonitrile=10-8/0-2
Flow rate: 1 mL/min
Measurement temperature: 40° C.
Amount of sample injected: 200 μL.

The degree of polymerization of the polyvinyl alcohol is generally about 100 to 10,000, and is preferably 300 or more, more preferably 500 or more, further preferably 1500 or more, specifically 2000 or more particularly in an application of a polishing composition. The degree of polymerization of the polyvinyl alcohol is preferably 4000 or less, more preferably 3000 or less, further preferably 2900 or less. When the degree of polymerization falls within the above range, the effects of the present invention are sufficiently exerted.

Examples of the polyvinyl alcohol for use in the present invention include "PVA-117" (degree of polymerization: 1,700, degree of saponification: 98 to 99% by mol), "PVA-117H" (degree of polymerization: 1,700, degree of saponification: 99.3% by mol or more), and "PVA-124" (degree of polymerization: 2,400, degree of saponification: 98-99% by mol) manufactured by Kuraray Co., Ltd., which are each sold in the form of powder.

The lower limit of the content of the polyvinyl alcohol in the first liquid is preferably 0.05% by mass or more, more preferably 0.1% by mass or more, further preferably 0.5% by mass or more based on the total mass of the first liquid. The upper limit of the content of the polyvinyl alcohol in the first liquid is preferably 10% by mass or less, more preferably 7% by mass or less, further preferably 5% by mass or less. In other words, the content of the polyvinyl alcohol is preferably 0.05-10% by mass, more preferably 0.1-7% by mass, further preferably 0.5-5% by mass. When the content of the polyvinyl alcohol falls within the above range, the effects of the present invention are sufficiently exerted.

(Water)

Water serves as a solvent of the polyvinyl alcohol. The water is preferably one containing no impurities as much as possible. The water is preferably water from which impurity ions are removed by an ion exchange resin, impurities are removed by a filter, and contaminants are removed by distillation. Examples of such water include ion exchange water, pure water, ultrapure water, and distilled water. For example, the total content of transition metal ions is preferably 100 ppb or less in order that inhibition of the action of other components contained in the wetting agent for a semiconductor and/or the polishing composition is avoided as much as possible.

The content of the water is preferably 90% by mass or more, more preferably 93% by mass or more, further preferably 95% by mass or more based on the total mass of the first liquid. The upper limit of the content of the water is preferably 99.95% by mass or less, more preferably 99.9% by mass or less, further preferably 99.5% by mass or less based on the total mass of the first liquid. In other words, the content of the water is preferably 90-99.95% by mass, more preferably 93-99.9% by mass, further preferably 95-99.5% by mass based on the total mass of the first liquid. When the content of the water falls within the above range, the effects of the present invention are sufficiently exerted.

(Method for Preparing First Liquid)

The method for preparing the first liquid having the constitution is not particularly limited, and examples thereof include a method including the following step A and step B;

Step A: a dispersion step of dispersing the polyvinyl alcohol in the water to thereby obtain a polyvinyl alcohol dispersion liquid; and Step B: a dissolution step of warming the polyvinyl alcohol dispersion liquid at 80° C. or more and stirring it to thereby dissolve the polyvinyl alcohol in the water, obtaining the first liquid.

In the present invention, the state where the polyvinyl alcohol is dispersed in the water means a state where a polyvinyl alcohol powder is ununiformly or uniformly present in the water, and the state where the polyvinyl alcohol is dissolved in the water means a state where the polyvinyl alcohol is hydrated and formed into a uniform solution where no polyvinyl alcohol powder is visually confirmed in the solution.

Step A: Dispersion Step

The temperature of the water in dispersion of the polyvinyl alcohol in the water is preferably 15° C. or more, more preferably 20° C. or more. The temperature of the water in dispersion of the polyvinyl alcohol in the water is preferably 25° C. or less. The temperature of the water preferably falls within the above range because the polyvinyl alcohol can be inhibited from being formed into an agglomerate in the water.

The content of the polyvinyl alcohol in the polyvinyl alcohol dispersion liquid is the same as the content of the polyvinyl alcohol in the first liquid obtained through the dissolution step after the dispersion step. The content of the polyvinyl alcohol preferably falls within the above range because the polyvinyl alcohol dispersion liquid can be efficiently prepared.

When the polyvinyl alcohol is dispersed in the water, stirring is preferably performed. For example, such stirring is preferably performed in a stirring vessel where a stirring machine is attached to the vessel, in the dispersion step.

Preferably, the dispersion step is terminated with a uniform dispersion state of the polyvinyl alcohol, as a rough indication, and proceeding to the next dissolution step is made.

Step B: Dissolution Step

The dissolution step herein refers to a period during which the temperature of the water in dissolution of the polyvinyl alcohol in the water exceeds 80° C. The temperature of the water in dissolution of the polyvinyl alcohol in the water is preferably 85° C. or more, more preferably 88° C. or more, further preferably 90° C. or more. The temperature of the water in dissolution of the polyvinyl alcohol in the water is preferably 98° C. or less, more preferably 96° C. or less, further preferably 94° C. or less. The temperature of the water preferably falls within the above range because the polyvinyl alcohol is sufficiently dissolved in the water and a uniform aqueous polyvinyl alcohol solution (first liquid) can be obtained.

The content of the polyvinyl alcohol in the first liquid obtained through the dissolution step is as described above.

When the polyvinyl alcohol is dissolved in the water, stirring is preferably performed. The stirring time (namely, the time taken for dissolution of the polyvinyl alcohol in the water) is preferably 10 minutes or more, more preferably 20 minutes or more. The stirring time is preferably 300 minutes or less, more preferably 200 minutes or less, further preferably 100 minutes or less. For example, the stirring time can be 80 minutes or less, 60 minutes or less, or 30 minutes or less.

Preferably, the dissolution step is terminated with a uniform dissolution state of the polyvinyl alcohol, as a rough indication, and proceeding to the next step is made after cooling of the resulting first liquid to 15-50° C. (preferably 20-35° C., for example, 25-28° C.). Such cooling may be any of cooling with an apparatus, or cooling by natural heat diffusion. Such cooling may also be any of air cooling and liquid cooling (for example, water cooling), and the type of a heat exchange medium is not limited. In one embodiment, the first liquid is preferably cooled at a cooling rate of 1-10° C./min, more preferably 1-5° C./min, further preferably 1-4° C./min. Thus, the dissolution state of the polyvinyl alcohol can be uniformly maintained in the first liquid.

According to one embodiment of the present invention, the first liquid is preferably prepared through step A and step B. Therefore, according to a preferable embodiment of the present invention, the first liquid is obtained by heating a polyvinyl alcohol dispersion liquid in which the polyvinyl alcohol is dispersed in the water, to 85-98° C. and then cooling the dispersion liquid to 15-50° C. Thus, the polyvinyl alcohol can be easily uniformly dissolved in the first liquid, resulting in a polyvinyl alcohol composition reduced in generation of an aggregate.

(Additive)

The first liquid may contain a known additive, as described above. The additive is not particularly limited, and is preferably added after dissolution of the polyvinyl alcohol in the water.

[Second Liquid]

The second liquid contains a solvent. The second liquid may further contain, if necessary, any known additive such as an abrasive, a surfactant, a water-soluble polymer, a thickener, a pH adjusting agent, a complexing agent, an antiseptic agent, and an antifungal agent. The second liquid here, for example, may contain only a solvent or may be a solution containing polyvinyl alcohol and a solvent. Therefore, according to one embodiment of the present invention, a mixed form of the first liquid containing the polyvinyl alcohol and water (second liquid) may be adopted, or a mixed form of the first liquid containing the polyvinyl alcohol and the second liquid containing polyvinyl alcohol may be adopted.

The second liquid may contain polyvinyl alcohol. In this case, the second liquid contains a solvent and polyvinyl alcohol. In a case where the second liquid contains polyvinyl alcohol, the lower limit of the content of the polyvinyl alcohol in the second liquid is preferably 0.05% by mass or more, more preferably 0.1% by mass or more, further preferably 0.5% by mass or more based on the total mass of the second liquid. The limit of the content of the polyvinyl alcohol in the second liquid is preferably 10% by mass or less, more preferably 7% by mass or less, further preferably 5% by mass or less.

The second liquid may contain an abrasive. In this case, the second liquid contains a solvent and an abrasive. In one embodiment, the second liquid contains a solvent, an abrasive, and polyvinyl alcohol. In a case where the second liquid contains an abrasive, the lower limit of the content of the abrasive in the second liquid is preferably 0.5% by mass or more, more preferably 1% by mass or more, further preferably 5% by mass or more based on the total mass of the second liquid. The upper limit of the content of the abrasive in the second liquid is preferably 80% by mass or less, more preferably 75% by mass or less, further preferably 60% by mass or less.

In one embodiment, the second liquid contains a solvent, an abrasive, and polyvinyl alcohol. In this case, the above contents can be applied to the content of the abrasive and the content of the polyvinyl alcohol contained in the second liquid.

(Solvent)

The solvent contained in the second liquid can be, for example, water; an alcohol compound such as methanol, ethanol, or ethylene glycol; a ketone compound such as acetone, or a mixture thereof. In particular, the solvent is preferably water. In other words, according to a preferable mode of the present invention, the solvent in the second liquid contains water. According to a more preferable mode of the present invention, the solvent in the second liquid contains substantially water. The "substantially" means that any solvent other than water can be contained as long as the objects and effects of the present invention are achieved, and the solvent more specifically contains preferably 90% by mass or more and 100% by mass or less of water and 0% by mass or more and 10% by mass or less of any solvent other than water, more preferably 99% by mass or more and 100% by mass or less of water and 0% by mass or more and 1% by mass or less of any solvent other than water, further preferably 99.5% by mass or more and 100% by mass or less of water and 0% by mass or more and 0.5% by mass or less of any solvent other than water. The solvent is most preferably water.

In a case where the polyvinyl alcohol composition is used in a wetting agent for a semiconductor and/or a polishing composition, the solvent for use in the second liquid is preferably water not containing impurities as much as possible, specifically more preferably pure water, ultrapure water, or distilled water, from which impurity ions are removed by an ion exchange resin and then foreign substances are removed through a filter, from the viewpoint of not inhibiting any action of components contained in the wetting agent for a semiconductor and/or the polishing composition.

The content of the solvent is preferably 90% by mass or more, more preferably 93% by mass or more, further preferably 95% by mass or more based on the total mass of the second liquid. The upper limit of the content of the solvent is preferably 100% by mass or less, more preferably 99.9% by mass or less, further preferably 99.5% by mass or less based on the total mass of the second liquid. In other words, the content of the solvent is preferably 90-100% by mass, more preferably 93-99.9% by mass, further preferably 95-99.5% by mass based on the total mass of the second liquid.

[Addition-In-Liquid Step]

In the present invention, a mixing step of mixing the first liquid containing the polyvinyl alcohol and the water, and the second liquid other than the first liquid to thereby obtain the polyvinyl alcohol composition includes an addition-in-liquid step of adding into the inside of any one solution of the first liquid and the second liquid, the other liquid of the first liquid and the second liquid. In other words, the production method of the present invention is characterized in that the mixing step of mixing the first liquid and the second liquid includes the addition-in-liquid step of adding into the inside of any one liquid of the first liquid and the second liquid, the other liquid of the first liquid or the second liquid.

In the addition-in-liquid step, the second liquid may be added into the inside of the first liquid, or the first liquid may be added into the inside of the second liquid. The addition-in-liquid method is not particularly limited, and examples thereof include a method including performing addition-in-liquid through a supply pipe. Specifically, one end of the supply pipe is placed in any one liquid of the first liquid and the second liquid, which serves as a supply liquid, and other end of the supply pipe is placed in the other liquid of the first liquid and the second liquid, which serves as a liquid to be supplied. Any one liquid of the first liquid and the second liquid, which serves as a supply liquid, is added through the supply pipe to any other solution of the first liquid and the second liquid, which serves as a liquid to be supplied, by use of a pump such as an air pump.

According to one embodiment of the present invention, the first liquid is preferably added into the inside of the second liquid. Thus, the polyvinyl alcohol in the first liquid is not in contact with air and is mixed with the second liquid, and thus the effect of suppression of generation of an agglomerate of the polyvinyl alcohol is more exerted.

The size of the supply pipe is here not particularly limited, and the size (inner size) of the supply pipe is preferably 50 cm or less. The supply pipe, thus configured, can allow for efficient addition-in-liquid without having any influence on a liquid surface.

The supply speed for performing addition-in-liquid is not particularly limited, and is preferably low to such an extent that no agglomerate is generated due to mutual collision of the polyvinyl alcohol. The supply speed is preferably 50 mL/min or more, more preferably 100 mL/min or more, further preferably 120 mL/min or more. The supply speed for performing addition-in-liquid is preferably 20 L/min or less. Such a supply speed can allow for efficient addition-in-liquid without having any influence on a liquid surface.

The other liquid of the first liquid and the second liquid, which serves as a liquid to be supplied, is preferably retained in a vessel having a stirring tool. Thus, stirring can be made with addition-in-liquid being performed. According to one embodiment of the present invention, the first liquid is added into the inside of the second liquid retained in the vessel having a stirring tool. Examples of the vessel having a stirring tool include an vertical stirring vessel and a horizontal stirring vessel.

The vertical stirring vessel is a vessel provided with a vertical rotating shaft and a stirring blade attached to the vertical rotating shaft. Examples of the system of the stirring blade include a propeller blade, a turbine blade, a paddle blade, a Pfaudler blade, an anchor blade, a Fullzone (registered trademark) blade (manufactured by Shinko Pantec Co., Ltd.), a Sanmeler blade (manufactured by Mitsubishi Heavy Industries, Ltd.), a Maxblend (registered trademark) blade (manufactured by Sumitomo Heavy Industries, Ltd.), a helical ribbon blade, and a twisting lattice blade (manufactured by Hitachi, Ltd.).

The horizontal stirring vessel means a vessel in which a plurality of rotating shafts of stirring blade are transverse (horizontal direction), which has a plurality of stirring blades almost perpendicularly extending to the rotating shafts, and in which the stirring blades provided on respective horizontal rotating shafts are shifted each other in the horizontal direction and arranged so as not to collide with positions thereof. Examples of the system of the stirring blade include single shaft-type stirring blades such as disk-type and paddle-type stirring blades, and twin shaft-type stirring blades such as a spectacle blade and a lattice blade (manufactured by Hitachi, Ltd.). Other examples include wheel-type, oar-type, bar-type and window frame-type stirring blades.

The size of the stirring vessel is not particularly limited, and the stirring vessel preferably having a size of for example, 0.01 m³ or more, more preferably 0.1 m³ or more, further preferably 1 m³ or more can be used. The size of the stirring vessel is preferably 20 m³ or less, more preferably 10 m³ or less.

The material of the stirring vessel is also not particularly limited. For example, one made of stainless steel is preferable, and one where the inner wall of a tank is coated with, for example, SUS316, glass, Teflon, or titanium is more preferable. A baffle plate (baffle) can be, if necessary, mounted to the stirring vessel. The baffle plate is not particularly limited in terms of the size, the shape, and the number of plates.

The strength and the size of such a rotating shaft are not particularly limited. The material of the rotating shaft is also not limited, and the shaft is, for example, preferably made of stainless steel, more preferably further coated with glass, Teflon, or titanium, or more preferably made of stainless steel of SUS316.

The number of such stirring blades used is also not particularly limited, and can be, for example, 1-10, preferably 1-5, more preferably 2-5. In a case where three or more such stirring blades are used, the interval among such stirring blades at a plurality of locations is also not limited, and such stirring blades are preferably placed evenly.

The size of each of such stirring blades is also not limited, and, for example, the ratio (L/D) of the stirring blade size (L) to the inner size (D) of the stirring vessel can be preferably 0.1 or more, more preferably 0.25 or more. The L/D can be preferably 0.9 or less, more preferably 0.75 or less. The "inner size of the stirring vessel" refers to the longest diameter in a direction perpendicular to the rotating shaft in the stirring vessel. For example, in a case where the stirring vessel used is configured from a cylindrical portion sandwiched between upper and lower mirror portions (upper and lower circular portions of the stirring vessel) of the stirring vessel, the inner size refers to the diameter in the tank of the cylindrical portion. The "stirring blade size" refers to a size determined by duplication of the longest distance from the center of the rotating shaft to the stirring blade tip. The "stirring blade tip" refers to the farthest portion in measurement perpendicular from the rotating shaft.

In the addition-in-liquid step, adjacent stirring blades may form any angle when viewed in the shaft direction. Such any angle preferably corresponds to zero degrees (parallel) or 90 degrees (right angle) from the viewpoint that stirring is efficiently performed.

The material of each of such stirring blades is also not particularly limited, and such each blade is, for example, preferably made of stainless steel, more preferably further coated with glass, Teflon, or titanium, or more preferably made of stainless steel of SUS316.

The atmosphere in the stirring vessel during stirring is not particularly limited, examples thereof include an air atmosphere, and an atmosphere of an inert gas such as argon or nitrogen, and stirring can be performed under an ordinary pressure or reduced pressure condition.

The temperature of the solution in the addition-in-liquid step being performed is preferably 20° C. or more, more preferably 25° C. or more. The temperature of the solution in the addition-in-liquid step being performed is preferably 80° C. or less, more preferably 60° C. or less. In a case where the stirring vessel is heated, examples of the method therefor include a method including heating the solution by heat transfer through a wall surface of the stirring vessel, in which a heat medium jacket is installed on the periphery of the stirring vessel, and a method including heating by heat transfer through a heat transfer pipe (coil) in the stirring vessel, and such a method may be used singly or in combinations thereof.

The number of rotations (namely, number of times of stirring) of such each stirring blade in the stirring vessel of a liquid to be supplied in the addition-in-liquid step is not particularly limited. Stirring may be performed or no stirring may be performed. In a case where stirring is performed, the number of rotations, which depends on the volume of the stirring vessel, is preferably 1 rpm or more. The number of rotations of such each stirring blade is preferably 300 rpm or less, more preferably 200 rpm or less, further preferably 100 rpm or less from the viewpoint of suppression of generation of an agglomerate of the polyvinyl alcohol. In other words, in a case where stirring is performed in the addition-in-liquid step, the number of rotations of such each stirring blade is preferably 1 rpm or more and 300 rpm or less, more preferably 1 rpm or more and 200 rpm or less, further preferably 1 rpm or more and 100 rpm or less. When the number of rotations of such each stirring blade falls within the above range, rotation vortex due to stirring is not too large and pinching of gas is decreased.

The time for the addition-in-liquid step depends on the amount of the solution which serves as a supply liquid (solution added), and addition is preferably terminated at, for example, 1-30 minutes.

The mixing ratio between the first liquid and the second liquid, on the mass ratio, preferably satisfies first liquid: second liquid=1:99-99:1, more preferably 10:90-90:10, further preferably 20:80-80:20, particularly preferably 30:70-70:30. The mass ratio can be, for example, 20:80-40:60, or 80:20-60:40.

The content of the polyvinyl alcohol in the polyvinyl alcohol composition obtained in the addition-in-liquid step is preferably 0.05% by mass or more, more preferably 0.1% by mass or more, further preferably 0.5% by mass or more based on the total mass of the polyvinyl alcohol composition. The upper limit of the content of the polyvinyl alcohol in the polyvinyl alcohol composition obtained in the addition-in-liquid step is preferably 10% by mass or less, more preferably 7% by mass or less, further preferably 5% by mass or less. When the content of the polyvinyl alcohol in the polyvinyl alcohol composition obtained in the addition-in-liquid step falls within the above range, generation of an aggregate can be suppressed and the effects of the present invention are more exerted.

[Step after Addition-In-Liquid Step]

Step C: Stirring Step

According to one embodiment of the present invention, a stirring step of stirring the polyvinyl alcohol composition after the addition-in-liquid step is included. The stirring step is preferably performed because the step is performed to thereby provide a state where the polyvinyl alcohol is uniformly dispersed.

The temperature of the polyvinyl alcohol composition in the stirring step being performed is preferably 20° C. or more, more preferably 23° C. or more, further preferably 25° C. or more, even more preferably 30° C. or more. The temperature of the polyvinyl alcohol composition in the stirring step being performed is preferably 80° C. or less, more preferably 60° C. or less.

The number of rotations of such each stirring blade (namely, number of times of stirring) in the stirring vessel in the stirring step depends on the volume of the stirring vessel, and is preferably 1 rpm or more. The number of rotations of such each stirring blade is preferably 300 rpm or less, more preferably 200 rpm or less, further preferably 100 rpm or less from the viewpoint of suppression of generation of an agglomerate of the polyvinyl alcohol. In other words, the number of rotations of such each stirring blade in the stirring step after the addition-in-liquid step is preferably 1 rpm or more and 300 rpm or less, more preferably 1 rpm or more and 200 rpm or less, further preferably 1 rpm or more and 100 rpm or less. When the number of rotations of such each stirring blade falls within the above range, rotation vortex due to stirring is not too large and pinching of gas is decreased.

The size of such each stirring blade is also not limited, and, for example, the ratio (L/D) of the stirring blade size (L) to the inner size (D) of the stirring vessel can be preferably 0.1 or more, more preferably 0.25 or more. The L/D can be preferably 0.9 or less, more preferably 0.75 or less.

The stirring step can be terminated with a state of the polyvinyl alcohol uniformly dispersed, as a rough indication, and, for example, the stirring time in the stirring step is preferably 1 minute or more, more preferably 2 minutes or more, further preferably 3 minutes or more. The stirring time in the stirring step is preferably 45 minutes or less, more preferably 30 minutes or less, further preferably 10 minutes or less.

Step D: Filtration Step

A filtration step is a step of filtration after preparation of the polyvinyl alcohol composition. This step can remove an aggregate in the polyvinyl alcohol composition. According to one embodiment of the present invention, a filtration step of filtering the polyvinyl alcohol composition obtained through the addition step is further included.

The content of the polyvinyl alcohol in the polyvinyl alcohol composition for use in the filtration step is preferably 0.05% by mass or more, more preferably 0.1% by mass or more, further preferably 0.5% by mass. The content of the polyvinyl alcohol in the polyvinyl alcohol composition is preferably 10% by mass or less, more preferably 7% by mass or less, further preferably 5% by mass or less. The content of the polyvinyl alcohol preferably falls within the above range because the viscosity of the polyvinyl alcohol composition is not excessively increased and a high filtration rate is obtained.

The filter medium for use in filtration of the polyvinyl alcohol composition is not particularly limited, and examples thereof include polypropylene, polystyrene (PS), polyethersulfone, nylon, nylon 66, cellulose, cellulose mixed ester, cellulose acetate, nitrocellulose, regenerated cellulose, polytetrafluoroethylene (PTFE), polycarbonate, glass, polyvinylidene fluoride (PVDF), an ethylene-tetrafluoroethylene copolymer, polyamide, triacetyl cellulose, polyvinyl chloride (PVC), polysulfone, polyester, polypropylene/polyethylene, an acrylic copolymer, polylacetic acid, polycaprolactone, polyglycolic acid, polydioxanone, polyhydroxy butyrate, polybutadiene, polyurethane, polymethyl methacrylate, and metals.

The filter structure is not particularly limited, and examples thereof include a depth structure, a pleat structure, and a membrane structure.

The pore size of the filter is not particularly limited, and is preferably 0.03 μm or more, more preferably 0.04 μm or more, further preferably 0.05 μm or more, still further preferably 0.1 μm or more, particularly preferably 0.2 μm or more. The pore size of the filter is preferably 0.03 μm or more because a high filtration rate is obtained. The pore size of the filter is preferably 100 μm or less, more preferably 70 μm or less, further preferably 50 μm or less. The pore size of the filter may be 20 μm or less, may be 10 μm or less, may be 5 μm or less, or may be 1 μm or less. The pore size of the filter is preferably 100 μm or less because the accuracy of filtration is enhanced.

The filtration method may be any of spontaneous filtration to be performed at ambient pressure, vacuum filtration, pressure filtration, and centrifugal filtration.

The filtration step may be performed twice or more. Conditions, for example, the pore size of the filter, are here appropriately modified. Examples include a method including the first dissolution filtration for removal of coarse particles by use of a filter having a larger pore size and the second dissolution filtration for removal of fine particles by use of a filter having a smaller pore size. Dissolution filtration can be performed twice or more to thereby more efficiently remove impurities.

Step E: Alkali Addition Step

According to one embodiment of the present invention, an alkali addition step of adding an alkali to the polyvinyl alcohol composition obtained through the addition-in-liquid step is further included. The polyvinyl alcohol composition is subjected to the alkali addition step and thus suitably used as a polishing composition and/or a wetting agent for a semiconductor, described below. The detail of the alkali addition step is described in the columns of the polishing composition and/or the wetting agent for a semiconductor.

[Polyvinyl Alcohol Composition]

According to one embodiment of the present invention, a polyvinyl alcohol composition containing polyvinyl alcohol is provided. The polyvinyl alcohol composition contains the first liquid and the second liquid, and thus contains at least polyvinyl alcohol and water. The polyvinyl alcohol composition may further contain, if necessary, a solvent other than water. The polyvinyl alcohol composition may contain, if necessary, an abrasive.

The content of the polyvinyl alcohol in the polyvinyl alcohol composition is preferably 0.0001% by mass or more, more preferably 0.0005% by mass or more, further preferably 0.001% by mass or more, particularly preferably 0.005% by mass or more based on the total mass of the polyvinyl alcohol composition. The content can be, for example, 0.01% by mass or more, 0.1% by mass or more, 0.4% by mass or more. The content of the polyvinyl alcohol is preferably 10% by mass or less, more preferably 7% by mass or less, further preferably 5% by mass or less, even more preferably 3.5% by mass or less, particularly preferably 3% by mass or less based on the total mass of the polyvinyl alcohol composition. The content can be, for example, 2% by mass or less, 1.5% by mass or less, or 0.9% by mass or less.

A polyvinyl alcohol composition obtained by the production method of the present invention is suppressed in generation of an aggregate, and is excellent in filtration ability. Thus, the polyvinyl alcohol composition obtained by the production method of the present invention is suitable for applications of a wetting agent for a semiconductor and/or a polishing composition.

The polyvinyl alcohol composition in the present invention may further contain any known additive such as a surfactant, a water-soluble polymer other than polyvinyl alcohol, a chelating agent, an organic acid, an organic acid salt, an inorganic acid, an inorganic acid salt, a pH adjusting agent, an oxidant, a metal anticorrosive, an antiseptic agent, and an antifungal agent. Such any additive contained in the polyvinyl alcohol composition may be added to at least one of the first liquid and the second liquid, and thus the additive is added to the polyvinyl alcohol composition. Alternatively, such any additive may be added in the form of a solution other than the first liquid and the second liquid, to the polyvinyl alcohol composition, or may be directly added to the polyvinyl alcohol composition.

<<Wetting Agent for a Semiconductor and Polishing Composition>>

A polyvinyl alcohol composition obtained by the production method of the present invention can be used in various applications. For example, the polyvinyl alcohol composition can be used in applications of, for example, an adhesive, a binder for pharmaceutical products, a dispersant, a film, cosmetics, a fibrous raw material, a paste, paint, an emulsifier, packaging, polishing, and rinsing after polishing. In particular, the polyvinyl alcohol composition is preferably used in applications of polishing and rinsing after polishing.

One mode of the present invention provides a wetting agent for a semiconductor and/or a polishing composition, which contains a polyvinyl alcohol composition produced by the production method of the present invention. In other words, one embodiment of the present invention provides a method for producing a wetting agent for a semiconductor and/or a polishing composition, which contains a polyvinyl alcohol composition, wherein the polyvinyl alcohol composition is obtained through an addition-in-liquid step of adding into the inside of any one liquid of a first liquid containing polyvinyl alcohol and water and a second liquid other than the first liquid, the other liquid of the first liquid and the second liquid. The wetting agent for a semiconductor according to the present mode contains the polyvinyl alcohol composition. The polyvinyl alcohol composition produced by the production method of the present invention is suitably used as a wetting agent for a semiconductor, and thus can be a polyvinyl alcohol composition for a wetting agent for a semiconductor. The polishing composition according to the present mode contains the polyvinyl alcohol composition. The polyvinyl alcohol composition produced by the production method of the present invention is suitably used as a polishing composition, and thus can be a polyvinyl alcohol composition for a polishing composition. The wetting agent for a semiconductor and/or the polishing composition according to the present mode may contain, if necessary, any other additive such as a pH adjusting agent.

The wetting agent for a semiconductor according to the present mode may be constituted by only the polyvinyl alcohol composition. In other words, according to one embodiment, the polyvinyl alcohol composition produced by the production method of the present invention is the wetting agent for a semiconductor.

The wetting agent for a semiconductor may be, for example, obtained by diluting the polyvinyl alcohol composition produced by the production method of the present invention with, for example, water. Therefore, according to one mode of the present invention, a wetting agent for a semiconductor, containing the polyvinyl alcohol composition produced by the production method of the present invention, and a third liquid containing water is provided. In other words, according to one mode of the present invention, a method for producing a wetting agent for a semiconductor, containing mixing the polyvinyl alcohol composition produced by the production method of the present invention with a third liquid containing water, is also provided.

The third liquid contains water. The third liquid may further contain, if necessary, any known additive such as a surfactant, a water-soluble polymer, a thickener, a pH adjusting agent (preferably alkali), a complexing agent, an antiseptic agent, and an antifungal agent. The third liquid here, for example, may contain only water or may further contain a solvent. The solvent contained in the third liquid can be, for example, an alcohol compound such as methanol, ethanol, or ethylene glycol; a ketone compound such as acetone, or a mixture thereof. According to a more preferable mode of the present invention, the solvent in the third liquid contains substantially water. The "substantially" means the same as the "substantially" with respect to the solvent in the second liquid.

In a case where a wetting agent for a semiconductor is produced by mixing the polyvinyl alcohol composition and the third liquid, the same method as the above method for producing a polyvinyl alcohol composition is suitably used. In other words, in a case where a wetting agent for a semiconductor is produced by mixing the polyvinyl alcohol composition and the third liquid, an addition-in-liquid step of adding into the inside of any one liquid of the polyvinyl alcohol composition and the third liquid, the other liquid of the polyvinyl alcohol composition and the third liquid, is included, in a preferable embodiment.

The mass ratio (polyvinyl alcohol composition:third liquid) between the polyvinyl alcohol composition and the third liquid in the wetting agent for a semiconductor is not particularly limited. For example, the ratio can be 10:90-90:10, 15:75-75:15, or 20:80-80:20.

According to one mode of the present invention, a polishing composition is provided which contain wetting agent for a semiconductor, containing the polyvinyl alcohol composition produced by the production method of the present invention, and an abrasive. The polishing composition according to the present mode contains the wetting agent for a semiconductor, containing the polyvinyl alcohol composition, and an abrasive. The polishing composition according to the present mode may contain, if necessary, any other additive such as a pH adjusting agent.

According to one mode of the present invention, a method for producing a polishing composition is provided which includes mixing the wetting agent for a semiconductor, containing the polyvinyl alcohol composition produced by the production method of the present invention, and an abrasive.

Polyvinyl alcohol has a hydroxy group (OH group) in its molecule. Thus, polyvinyl alcohol has the property of being easily aggregated by the action of intramolecular or intermolecular hydrogen bonding. The polyvinyl alcohol contained in each of the polishing composition and/or the wetting agent for a semiconductor may be partially aggregated to lead to generation of an agglomerate and a reduction in dispersibility, thereby leading to deterioration in reduction performance of surface defects after polishing or after rinsing. According to the technique disclosed herein, a polishing composition and/or a wetting agent for a semiconductor suppressed appropriately in generation of an agglomerate of polyvinyl alcohol and enhanced in dispersibility can be realized.

Hereinafter, suitable modes of the wetting agent for a semiconductor and/or the polishing composition of the present invention are described. Any matter which is other than items particularly mentioned herein and which is necessary for carrying out of the present invention can be identified as an item designed by those skilled in the art based on conventional techniques in the art. The present invention can be carried out based on the content disclosed herein and the common technical knowledge in the art.

(Polyvinyl Alcohol Composition)

The wetting agent for a semiconductor and/or the polishing composition disclosed herein contains the polyvinyl alcohol composition produced by the production method of the present invention.

The concentration (pure content) of the polyvinyl alcohol in each of the wetting agent for a semiconductor and/or the polishing composition is not particularly limited, and can be, for example, 0.0001% by mass or more. The concentration is preferably 0.0005% by mass or more, more preferably 0.001% by mass or more, and may be, for example, 0.003% by mass or more, or 0.005% by mass or more, from the viewpoint of, for example, a reduction in haze. The concentration (pure content) of the polyvinyl alcohol is usually preferably 0.5% by mass or less, and may be 0.2% by mass or less or may be 0.1% by mass or less from the viewpoint of, for example, acting properties on a substrate.

(Abrasive)

The polishing composition disclosed herein contains an abrasive. In other words, the polishing composition contains the polyvinyl alcohol composition and an abrasive. The abrasive serves to mechanically polish the surface of an object to be polished. The material and properties of the abrasive are not particularly limited, and can be appropriately selected depending on the intended use, the aspect of use, and the like of the polishing composition. Examples of the abrasive include inorganic particles, organic particles, and organic/inorganic composite particles. Specific examples of the inorganic particles include oxide particles such as silica particles, alumina particles, cerium oxide particles, chromium oxide particles, titanium dioxide particles, zirconium oxide particles, magnesium oxide particles, manganese dioxide particles, zinc oxide particles and colcothar particles; nitride particles such as silicon nitride particles and boron nitride particles; carbide particles such as silicon carbide particles and boron carbide particles; diamond particles; and carbonic acid salts such as calcium carbonate and barium carbonate. Specific examples of the organic particles include polymethyl methacrylate (PMMA) particles and poly(meth)acrylic acid particles ("(meth) acrylic acid" is here meant to inclusively refer to acrylic acid and methacrylic acid.), and polyacrylonitrile particles. Such abrasives may be used singly or in combinations of two or more kinds thereof. The abrasive here used may be in the form of a synthetic product or a commercially available product. The wetting agent for a semiconductor contains no abrasive.

The abrasive is preferably inorganic particle, in particular, preferably particle made of metal or semi-metal oxide, particularly preferably silica particle. Silica particles are particularly significantly adopted as the abrasive in a polishing composition which can be used in polishing (for example, final polishing) of a substrate having a surface made of silicon, such as a silicon wafer described below. The technique disclosed herein can be, for example, preferably carried out in an aspect where the abrasives are made of substantially silica particles. The "substantially" means that 95% by mass or more (preferably 98% by mass or more, more preferably 99% by mass or more, optionally 100% by mass.) of particles constituting the abrasives are silica particles.

Specific examples of the silica particles include those of colloidal silica, fumed silica, and precipitated silica. The silica particles can be used singly or in combinations of two or more kinds thereof. Colloidal silica is particularly preferably used because a polished surface excellent in surface quality is easily obtained after polishing. The colloidal silica here adopted can be, for example, preferably colloidal silica produced with water glass (Na silicate) as a raw material by an ion exchange method, or colloidal silica by an alkoxide method (colloidal silica produced by a hydrolytic condensation reaction of alkoxysilane). The colloidal silica can be used singly or in combinations of two or more kinds thereof.

The abrasive may be subjected to surface modification. Specifically, the silica particles may each have a cationic group. In other words, the silica particles may be cation-modified silica particles or cation-modified colloidal silica. Examples of the colloidal silica having a cationic group (cation-modified colloidal silica) preferably include colloidal silica having a surface onto which an amino group is immobilized. Examples of the method for producing such colloidal silica having a cationic group include a method for immobilizing a silane coupling agent having an amino group, such as aminoethyltrimethoxysilane, aminopropyltrimethoxysilane, aminoethyltriethoxysilane, aminopropyltriethoxysilane, aminopropyldimethylethoxysilane, aminopropylmethyldiethoxysilane, or aminobutyltriethoxysilane, as described in Japanese Patent Laid-Open No. 2005-162533, onto surfaces of the silica particles. Thus, colloidal silica (amino group-modified colloidal silica) having a surface onto which an amino group is immobilized can be obtained.

The silica particles may each have an anionic group. In other words, the silica particles may be anion-modified silica particles or anion-modified colloidal silica. Examples of the colloidal silica (anion-modified colloidal silica) having an anionic group preferably include colloidal silica having a surface onto which an anionic group such as a carboxylic acid group, a sulfonic acid group, a phosphonic acid group, or an aluminic acid group is immobilized. The method for producing such colloidal silica having an anionic group is not particularly limited, and examples thereof include a method for reacting a silane coupling agent having an anionic group at a terminal, with colloidal silica.

In a specific example, immobilization of a sulfonic acid group to the colloidal silica can be made by, for example, a method described in "Sulfonic acid-functionalized silica through of thiol groups", Chem. Commun. 246-247 (2003). Specifically, colloidal silica (sulfonic acid-modified colloidal silica) having a surface onto which a sulfonic acid group is immobilized can be obtained by coupling a silane coupling agent having a thiol group, such as 3-mercaptopropy-ltrimethoxysilane, with the colloidal silica and then oxidizing the thiol group by hydrogen peroxide.

Immobilization of a carboxylic acid group to the colloidal silica can be made by, for example, a method described in "Novel Silane Coupling Agents Containing a Photolabile 2-Nitrobenzyl Ester for Introduction of a Carboxy Group on the Surface of Silica Gel", Chemistry Letters, 3, 228-229 (2000). Specifically, colloidal silica (carboxylic acid-modified colloidal silica) having a surface onto which a carboxylic acid group is immobilized can be obtained by coupling a silane coupling agent containing a photo-reactive 2-nitrobenzyl ester, with colloidal silica, and then irradiating the resultant with light.

The true specific gravity of the material constituting the abrasive (for example, silica constituting the silica particles) is preferably 1.5 or more, more preferably 1.6 or more, further preferably 1.7 or more. The upper limit of the true specific gravity of the material constituting the abrasive (for example, silica constituting the silica particles) is not particularly limited, and is typically 2.3 or less, for example, 2.2 or less. The true specific gravity of the abrasive (for example, silica particles), here adopted, can be a measurement value by a liquid replacement method with ethanol as a replacement liquid.

The BET size of the abrasive (typically silica particles) is not particularly limited, and is preferably 5 nm or more, more preferably 10 nm or more from the viewpoint of, for example, polishing efficiency. The BET size is preferably 15 nm or more, more preferably 20 nm or more (for example, more than 20 nm) from the viewpoint of allowing higher polishing effects (for example, effects such as a reduction in haze and removal of defects) to be obtained. The BET size of the abrasive is preferably 100 nm or less, more preferably 50 nm or less, further preferably 40 nm or less from the viewpoint of, for example, prevention of scratch. The technique disclosed herein easily provides a high-quality surface (for example, surface small in number of LPDs), and thus is preferably applied to polishing demanded to provide a high-quality surface after the polishing. The abrasive for use in the polishing composition are preferably abrasive having a BET size of 35 nm or less (typically less than 35 nm, more preferably 32 nm or less, for example, less than 30 nm).

The BET size herein refers to a particle size calculated from the specific surface area (BET value) measured by the BET method, according to the expression of BET size (nm)=6000/(true density (g/cm³)×BET value (m²/g)). For example, the BET size can be calculated according to BET size (nm)=2727/BET value (m²/g), in the case of the silica particles. The specific surface area can be measured with, for example, a surface area measurement apparatus, trade name "Flow Sorb II 2300" manufactured by Micromeritics Instruments Corporation.

The average secondary particle size of the abrasive is not particularly limited, and is preferably 10 nm or more, more preferably 15 nm or more, even more preferably 20 nm or more, particularly preferably 25 nm or more from the viewpoint of, for example, polishing efficiency. The average secondary particle size is preferably 30 nm or more, more preferably 40 nm or more from the viewpoint of allowing higher polishing effects, for example, effects such as a reduction in haze and removal of defects, to be obtained. The average secondary particle size of the abrasive is preferably 300 nm or less, more preferably 200 nm or less, further preferably 150 nm or less, even more preferably 125 nm or less from the viewpoint of suppression of local stress applied to a substrate surface by the abrasive. The technique disclosed herein is preferably an aspect where abrasive having an average secondary particle size of 100 nm or less, for example, less than 80 nm (typically 45 nm or less) are used, because, for example, a higher-quality surface is easily obtained, and a polishing composition is enhanced in stability due to a reduction in average secondary particle size of the abrasive which can be performed. The average secondary particle size of the abrasive can be measured by a dynamic light scattering method using, for example, a model "UPA-UT151" manufactured by Nikkiso Co., Ltd.

The shape (outer shape) of the abrasive may be spherical or non-spherical. Examples of the non-spherical particles include a peanut shape (namely, peanut hull shape), a cocoon shape, a konpeito shape, and a rugby ball shape. For example, abrasive having a peanut shape or a cocoon shape can be preferably adopted for most of particles.

The average value (average aspect ratio) of the longer size/shorter size ratio of the abrasive is not particularly limited, and is in principle 1.0 or more, preferably 1.05 or more, further preferably 1.1 or more. An increase in average aspect ratio can allow a higher polishing efficiency to be realized. The average aspect ratio of the abrasive is preferably 3.0 or less, more preferably 2.0 or less, further preferably 1.5 or less from the viewpoint of, for example, reduction of scratch.

The shape (outer shape) and the average aspect ratio of the abrasive can be identified by, for example, electron microscope observation. A specific procedure for identifying the average aspect ratio is, for example, performed by use of a scanning electron microscope (SEM), and a minimum rectangle circumscribed around each particle image of a predetermined number of particles (for example, 200 particles) of abrasive whose independent shapes can be recognized is drawn. The value obtained by dividing the length of the longer side (value of longer size) by the length of the shorter side (value of shorter size) with respect to the rectangle drawn of such each particle image is calculated as the longer size/shorter size ratio (aspect ratio). The aspect ratios of the predetermined number of particles are arithmetically averaged, and thus the average aspect ratio can be determined.

The content of the abrasive in the polishing composition is not particularly limited, and is typically 0.01% by mass or more, preferably 0.05% by mass or more, more preferably 0.10% by mass or more, for example, 0.15% by mass or more. An increase in content of the abrasive can allow a higher polishing speed to be realized. The content is usually appropriately 10% by mass or less, preferably 7% by mass or less, more preferably 5% by mass or less, further preferably 2% by mass or less, for example, 1% by mass or less, and may be 0.7% by mass or less from the viewpoint of dispersion stability of the abrasive in the polishing composition. In preferable one aspect, the content may be 0.5% by mass or less, may be 0.4% by mass or less, or may be 0.2% by mass or less.

(Surfactant)

The polishing composition and/or the wetting agent for a semiconductor disclosed herein may contain a surfactant as long as the effects of the present invention are not remarkably impaired. The surfactant here used can be any of anionic, cationic, non-ionic, and amphoteric surfactants. An aspect where the polishing composition and/or the wetting agent for a semiconductor disclosed herein do/does not substantially contain any surfactant can be carried out.

The anionic surfactant is classified to, for example, sulfuric acid-based, sulfonic acid-based, phosphoric acid-based, phosphoric acid-based, and carboxylic acid-based surfactants. Specific examples of the anionic surfactant include alkyl sulfuric acid ester, polyoxyethylene alkyl sulfuric acid ester, polyoxyethylene alkyl sulfuric acid, alkyl sulfuric acid, alkyl ether sulfuric acid ester, higher alcohol sulfuric acid ester, alkyl phosphoric acid ester, alkylbenzenesulfonic acid, α-olefinsulfonic acid, alkylsulfonic acid, styrenesulfonic acid, alkylnaphthalenesulfonic acid, alkyl diphenyl ether disulfonic acid, polyoxyethylene alkyl ether acetic acid, polyoxyethylene alkyl ether phosphoric acid, polyoxyethylene alkyl phosphoric acid ester, polyoxyethylene sulfosuccinic acid, alkylsulfosuccinic acid, or a salt thereof, a taurine-based surfactant, a sarcosinate-based surfactant, an isethionate-based surfactant, an N-acyl acidic amino acid-based surfactant, a higher fatty acid salt, and acylated polypeptide. Specific examples of the alkylsulfonic acid or salt thereof include a dodecylsulfonic acid and a dodecylsulfonic acid salt.

The cationic surfactant is classified to, for example, polyoxyethylene alkylamine, alkylalkanolamide, alkylamine salt, amine oxide, quaternary ammonium salt, and tertiary amide amine-type surfactants. Specific examples of the cationic surfactant include coconut amine acetate, stearylamine acetate, lauryldimethylamine oxide, stearic acid dimethylaminopropylamide, an alkyltrimethylammonium salt, an alkyldimethylammonium salt, and an alkyl-benzyldimethylammonium salt.

Specific examples of the amphoteric surfactant include alkyl betaine-based and alkylamine oxide-based surfactants. Specific examples of the amphoteric surfactant include coco betaine, lauramide propyl betaine, cocamido propyl betaine, sodium lauroamophoacetate, sodium cocoamphoacetate, coconut oil fatty acid amide propyl betaine, and lauryl betaine (lauryldimethylaminoacetic acid betaine).

Specific examples of the non-ionic surfactant include oxyalkylene polymers such as polyethylene glycol, polypropylene glycol and polytetramethylene glycol; polyoxyalkylene derivatives (for example, polyoxyalkylene adducts) such as polyoxyethylene alkyl ether, polyoxyethylene alkylamine, polyoxyalkylene alkyl ether, polyoxyethylene alkyl phenyl ether, polyoxyethylene fatty acid ester, polyoxyethylene glyceryl ether fatty acid ester and polyoxyethylene sorbitan fatty acid ester; copolymers of a plurality of oxyalkylenes (for example, a diblock-type copolymer, a triblock-type copolymer, a random-type copolymer, and an alternate copolymer); sucrose fatty acid ester, sorbitan fatty acid ester, glycerin fatty acid ester, polyoxyethylene fatty acid ester, and alkylalkanolamide. Such a surfactant may be used singly or in combinations of two or more kinds thereof.

The number of carbon atoms in an alkyl group of the polyoxyethylene alkyl ether which can be here used is not particularly limited. For example, the number of carbon atoms in the alkyl group is preferably 5 or more, more preferably 6 or more, further preferably 7 or more, particularly preferably 8 or more, specifically 9 or more. For example, the number of carbon atoms in the alkyl group is preferably 12 or less, more preferably 11 or less. The number of carbon atoms in the alkyl group is, for example, 10. The molar number of addition of ethylene oxide in polyoxyethylene alkyl ether is not particularly limited, and is preferably 4 or more, more preferably 5 or more, and preferably 15 or less, more preferably 10 or less, further preferably 8 or less, particularly preferably 7 or less. The surfactant usable in the polishing composition and/or the wetting agent for a semiconductor disclosed herein is preferably polyoxyethylene octyl ether where the molar number of addition of ethylene oxide is 4-10 (for example, 6), from the viewpoint of reduction of surface defects.

Specific examples of the non-ionic surfactant containing a polyoxyalkylene structure include block copolymers of ethylene oxide (EO) and propylene oxide (PO) (diblock-type copolymer, PEO (polyethylene oxide)-PPO (polypropylene oxide)-PEO-type triblock form, PPO-PEO-PPO-type tri-block copolymer, and the like), random copolymers of EO and PO, polyoxyethylene glycol, polyoxyethylene propyl ether, polyoxyethylene butyl ether, polyoxyethylene pentyl ether, polyoxyethylene hexyl ether, polyoxyethylene octyl ether, polyoxyethylene-2-ethylhexyl ether, polyoxyethylene nonyl ether, polyoxyethylene decyl ether, polyoxyethylene isodecyl ether, polyoxyethylene tridecyl ether, polyoxyethylene lauryl ether, polyoxyethylene cetyl ether, polyoxyethylene stearyl ether, polyoxyethylene isostearyl ether, polyoxyethylene oleyl ether, polyoxyethylene phenyl ether, polyoxyethylene octyl phenyl ether, polyoxyethylene nonyl phenyl ether, polyoxyethylene dodecyl phenyl ether, polyoxyethylene styrenated phenyl ether, polyoxyethylene laurylamine, polyoxyethylene stearylamine, polyoxyethylene oleylamine, polyoxyethylene monolauric acid ester, polyoxyethylene monostearic acid ester, polyoxyethylene distearic acid ester, polyoxyethylene monooleic acid ester, polyoxyethylene dioleic acid ester, monolauric acid polyoxyethylene sorbitan, monopalmitic acid polyoxyethylene sorbitan, monostearic acid polyoxyethylene sorbitan, monooleic acid polyoxyethylene sorbitan, trioleic acid polyoxyethylene sorbitan, tetraoleic acid polyoxyethylene sorbit, polyoxyethylene castor oil, and polyoxyethylene hardened castor oil.

The weight average molecular weight (Mw) of the surfactant is preferably less than 2000, more preferably 1500 or less, further preferably 700 or less, particularly preferably 500 or less. In a case where the surfactant is a polyoxyalkylene derivative, the Mw thereof is preferably 100 or more, more preferably 200 or more, further preferably 300 or more. The polishing composition and/or the wetting agent for a semiconductor, which contains such a surfactant having an Mw in the range, thus allows for suitable reduction of surface defects. The weight average molecular weight of the surfactant, here adopted, can be the molecular weight calculated based on chemical formula.

The concentration of the surfactant in each of the polishing composition and/or the wetting agent for a semiconductor is not particularly limited, and can be, for example, 0.0001% by mass or more, and is preferably 0.0003% by mass or more. The concentration of the surfactant in the polishing composition and/or the surfactant is usually preferably 0.2% by mass or less, more preferably 0.1% by mass or less, and may be 0.05% by mass or less. In preferable one aspect, the concentration of the surfactant in the polishing composition and/or the surfactant may be 0.0001% by mass or more and 0.002% by mass or less, or may be 0.0002% by mass or more and 0.001% by mass or less. In another preferable aspect, the concentration of the surfactant in the polishing composition and/or the surfactant may be 0.005% by mass or more and 0.03% by mass or less.

The molar ratio of the content of the polyvinyl alcohol to the content of the surfactant in each of the polishing composition and/or the wetting agent for a semiconductor is preferably 1 or less, more preferably 0.5 or less, further preferably 0.1 or less (for example, 0.07 or less). In such an aspect, the molar ratio of the content of the polyvinyl alcohol to the content of the surfactant is usually 0.01 or more, preferably 0.02 or more, more preferably 0.03 or more, further preferably 0.04 or more. When the polyvinyl alcohol and the surfactant are contained at such a compounding ratio, the polyvinyl alcohol is appropriately inhibited from being aggregated, and surface defects are easily reduced.

(Water-Soluble Polymer Other than Polyvinyl Alcohol)

Examples of a water-soluble polymer other than the polyvinyl alcohol include respective compounds containing a hydroxyl group, a carboxy group, an acyloxy group, a sulfo group, an amide structure, an imide structure, a quaternary ammonium structure, a heterocyclic ring structure, a vinyl structure, and the like in their molecules. The water-soluble polymer other than the polyvinyl alcohol, here used, may be any of a natural polymer compound, a semisynthetic polymer compound, and a synthetic polymer compound. The natural polymer compound is not particularly limited, and examples thereof preferably include polysaccharide. The semisynthetic polymer compound is not particularly limited, and examples thereof preferably include a cellulose derivative and a starch derivative. The synthetic polymer compound is not particularly limited, and examples thereof preferably include a polymer having an oxyalkylene unit and a polymer containing a nitrogen atom. In one aspect of the polymer containing a nitrogen atom, for example, an N-vinyl-type polymer or an N-(meth)acryloyl-type polymer can be used. Specific examples of these compounds are described below.

The polysaccharide is not particularly limited, and examples thereof include carrageenan, xanthane gum, glycogen, alginic acid, pectin, pectic acid, starch, a starch derivative, amylose, amylopectin, agar, curdlan, pullulan, guar gum, konjac mannan, and tamarind gum.

The cellulose derivative is not particularly limited, and examples thereof include cellulose derivatives such as hydroxyethylcellulose (hereinafter, also simply referred to as "HEC".), hydroxypropylcellulose, hydroxyethylmethylcellulose, hydroxypropylmethylcellulose, methylcellulose, ethylcellulose, ethylhydroxyethylcellulose and carboxymethylcellulose, and pullulan. The type of such a cellulose derivative may be adopted singly or in combinations of two or more kinds thereof. Here, such a cellulose derivative refers to one which contains a β-glucose unit as a main repeating unit and in which some hydroxyl groups of cellulose are substituted with other substituents.

The starch derivative is not particularly limited, and examples thereof include cation starch, phosphoric acid starch, and a carboxymethyl starch salt. The starch derivative refers to a polymer containing an α-glucose unit as a main repeating unit.

The polymer having an oxyalkylene unit is not particularly limited, and examples thereof include polyethylene oxide (PEO), polypropylene oxide (PPO), a block copolymer of ethylene oxide (EO) and propylene oxide (PO) or butylene oxide (BO), and a random copolymer of EO and PO or BO. In particular, a block copolymer of EO and PO or a random copolymer of EO and PO is preferable. The block copolymer of EO and PO can be a diblock form, a triblock form or the like containing a PEO block and a polypropylene oxide (PPO) block. Examples of the triblock form include a PEO-PPO-PEO-type triblock form and a PPO-PEO-PPO-type triblock form. In particular, a PEO-PPO-PEO-type triblock form is more preferable.

The molar ratio [EO/PO] of EO and PO constituting the block copolymer or random copolymer of EO and PO in the copolymer is preferably more than 1, more preferably 2 or more, further preferably 3 or more from the viewpoints of, for example, solubility in water, and cleaning ability. In further preferable one aspect, the molar ratio [EO/PO] is, for example, 5 or more.

Examples of the N-vinyl-type polymer include a polymer containing a repeating unit derived from a monomer having a nitrogen-containing heterocyclic ring (for example, lactam ring). Examples of such a polymer include a homopolymer and a copolymer of an N-vinyl lactam-type monomer (for example, a copolymer where the copolymerizing proportion of the N-vinyl lactam-type monomer is more than 50% by mass), and a homopolymer and a copolymer of an N-vinyl linear amide (for example, a copolymer where the copolymerizing proportion of the N-vinyl linear amide is more than 50% by mass).

Specific examples of the N-vinyl lactam-type monomer (namely, a compound having a lactam structure and an N-vinyl group in one molecule) include N-vinylpyrrolidone (VP), N-vinylpiperidone, N-vinylmorpholinone, N-vinyl caprolactam (VC), N-vinyl-1,3-oxazin-2-one, and N-vinyl-3,5-morpholinedione. Specific examples of the polymer containing an N-vinyl lactam-type monomer unit include polyvinylpyrrolidone, polyvinyl caprolactam, a random copolymer of VP and VC, a random copolymer of one of or both VP and VC, and other vinyl monomer (for example, an acrylic monomer or a vinyl ester-based monomer), and a block copolymer, an alternate copolymer and a graft copolymer each containing a polymer chain containing one of or both VP and VC.

Specific examples of the unit N-vinyl linear amide include N-vinylacetamide, N-vinylpropionic acid amide, and N-vinylbutyric acid amide.

Examples of the N-(meth)acryloyl-type polymer include a homopolymer and a copolymer of an N-(meth)acryloyl-type monomer (typically, a copolymer where the copolymerizing proportion of the N-(meth)acryloyl-type monomer is more than 50% by mass). Examples of the N-(meth)acryloyl-type monomer include a linear amide having an N-(meth)acryloyl group and a cyclic amide having an N-(meth)acryloyl group.

Examples of the linear amide having an N-(meth)acryloyl group include (meth)acrylamide; N-alkyl(meth)acrylamides such as N-methyl(meth)acrylamide, N-ethyl(meth)acrylamide, N-propyl(meth)acrylamide, N-isopropyl(meth)acrylamide and N-n-butyl(meth)acrylamide; and N,N-dialkyl(meth)acrylamides such as N,N-dimethyl(meth)acrylamide, N,N-diethyl(meth)acrylamide, N,N-dipropyl(meth)acrylamide, N,N-diisopropyl(meth)acrylamide and N,N-di(n-butyl)(meth)acrylamide. Examples of a polymer containing the linear amide having an N-(meth)acryloyl group, as a monomer unit, include a homopolymer of N-isopropylacrylamide and a copolymer of N-isopropylacrylamide (for example, a copolymer where the copolymerizing proportion of the N-isopropylacrylamide is more than 50% by mass).

Examples of the cyclic amide having an N-(meth)acryloyl group include N-acryloylmorpholine, N-acryloylthiomorpholine, N-acryloylpiperidine, N-acryloylpyrrolidine, N-methacryloylmorpholine, N-methacryloylpiperidine, and N-methacryloylpyrrolidine. Examples of a polymer containing the cyclic amide having an N-(meth)acryloyl group, as a monomer, include an acryloylmorpholine-based polymer (PACMO). Typical examples of the acryloylmorpholine-based polymer include a homopolymer of N-acryloylmorpholine (ACMO) and a copolymer of ACMO (for example, a copolymer where the copolymerizing proportion of the ACMO is more than 50% by mass). The proportion of the molar number of the ACMO unit in the molar number of the entire repeating unit in the acryloylmorpholine-based polymer is usually 50% or more, properly 80% or more (for example, 90% or more, typically 95% or more). The entire repeating unit in the water-soluble polymer may be constituted substantially from the ACMO unit.

Other examples of the polymer containing a nitrogen atom include an imine derivative polyhydroxylethylacrylamide (PHEAA), poly-N-vinylimidazole (PVI), poly-N-vinylcarbazole, and poly-N-vinylpiperidine. The polymer containing a nitrogen atom may be a homopolymer or a copolymer in terms of the type thereof, and may be used singly or in combinations of two or more kinds thereof.

The water-soluble polymer other than the polyvinyl alcohol can be a water-soluble polymer having at least one functional group selected from a cationic group, an anionic group and a non-ionic group, in its molecule. A non-ionic polymer can be preferably adopted as the water-soluble polymer from the viewpoints of, for example, reduction of an aggregated product and an enhancement in cleaning ability.

Specific examples of other water-soluble polymer include polycarboxylic acid, polycarboxylic acid amide, polycarboxylic acid ester, polyphosphonic acid, polysulfonic acid such as polystyrenesulfonic acid, an ethylene oxide polymer, a vinyl polymer, a water-soluble polymer such as a cationic polymer, and a copolymer, a salt and a derivative thereof. Specific examples of the polycarboxylic acid, the polycarboxylic acid amide, the polycarboxylic acid ester or the polycarboxylic acid salt include polyaspartic acid, polyglutamic acid, polylysine, polymalic acid, polymethacrylic acid, a polymethacrylic acid ammonium salt, a polymethacrylic acid sodium salt, polymaleic acid, polyitaconic acid, polyfumaric acid, poly(p-styrenecarboxylic acid), polyacrylic acid, polyacrylamide, aminopolyacrylamide, polymethyl acrylate, polyethyl acrylate, a polyacrylic acid ammonium salt, a polyacrylic acid sodium salt, polyamide acid, a polyamide acid ammonium salt, a polyamide acid sodium salt, and polyglyoxylic acid. Specific examples of the cationic polymer include a cationized cellulose derivative, cationic starch, a cationized guar gum derivative, a diallyl quaternary ammonium salt/acrylamide copolymerized product, a quaternized polyvinylpyrrolidone derivative, and a dicyandiamide-diethylenetriamine condensate. Such a water-soluble polymer may be used singly or in combinations of two or more kinds thereof.

The weight average molecular weight (Mw) of the water-soluble polymer is typically $2\times10^3$ or more, and may be $5\times10^3$ or more, may be $1\times10^4$ or more, may be $5\times10^4$ or more, may be $10\times10^4$ or more, or may be $20\times10^4$ or more. The Mw of the dispersant may be $100\times10^4$ or less, may be $50\times10^4$ or less, may be $45\times10^4$ or less, or may be $40\times10^4$ or less.

The concentration of the water-soluble polymer in each of the polishing composition and/or the wetting agent for a semiconductor is not particularly limited, and can be, for example, 0.0001% by mass or more, and is preferably 0.0003% by mass or more. The concentration of the water-soluble polymer in each of the polishing composition and/or the wetting agent for a semiconductor can be usually preferably 0.2% by mass or less, more preferably 0.1% by mass or less, and may be 0.05% by mass or less. In preferable one aspect, the concentration of the water-soluble polymer in each of the polishing composition and/or the wetting agent for a semiconductor may be 0.0001% by mass or more and 0.002% by mass or less, or may be 0.0002% by mass or more and 0.001% by mass or less. In another preferable aspect, the concentration of the water-soluble polymer in each of the polishing composition and/or the wetting agent for a semiconductor may be 0.005% by mass or more and 0.03% by mass or less.

The molar ratio of the content of the polyvinyl alcohol to the content of the water-soluble polymer in each of the polishing composition and/or the wetting agent for a semiconductor is preferably 15 or less, more preferably 10 or less, further preferably 5 or less (for example, 4 or less). In such an aspect, the molar ratio of the content of the polyvinyl alcohol to the content of the water-soluble polymer is usually 0.1 or more, preferably 0.3 or more, more preferably 0.5 or more, further preferably 1 or more. When the polyvinyl alcohol and the water-soluble polymer are contained at such a compounding ratio, an aggregate of the polyvinyl alcohol is appropriately suppressed and surface defects are easily reduced.

(pH Adjusting Agent)

The polishing composition and/or the wetting agent for a semiconductor disclosed herein may further contain a pH adjusting agent. The pH adjusting agent is added mainly for the purpose of adjustment of the pH of each of the polishing composition and/or the wetting agent for a semiconductor disclosed herein. The pH adjusting agent is not particularly limited as long as it is a compound having a pH adjustment function, and a known compound can be used. Examples include an alkali and an acid.

The alkali herein refers to a compound which, when dissolved in water, serves to increase the pH of an aqueous solution. The alkali here used can be any of an organic or inorganic alkali containing nitrogen, alkali metal hydroxide, alkali earth metal hydroxide, various carbonic acid salts, and various hydrogen carbonic acid salts. Examples of the alkali containing nitrogen include a quaternary ammonium compound, a quaternary phosphonium compound, ammonia, and amine (preferably water-soluble amine).

Specific examples of the alkali metal hydroxide include potassium hydroxide and sodium hydroxide. Specific examples of the carbonic acid salt or the hydrogen carbonic acid salt include ammonium hydrogen carbonate, ammonium carbonate, potassium hydrogen carbonate, potassium carbonate, hydrogen carbonate sodium, and sodium carbonate. Specific examples of the amine include methylamine, dimethylamine, trimethylamine, ethylamine, diethylamine, triethylamine, ethylenediamine, monoethanolamine, N-(β-aminoethyl)ethanolamine, hexamethylenediamine, diethylenetriamine, triethylenetetramine, anhydrous piperazine, piperazine hexahydrate, 1-(2-aminoethyl)piperazine, N-methylpiperazine, guanidine, and azoles such as imidazole and triazole. Specific examples of the quaternary phosphonium compound include quaternary phosphonium hydroxides such as tetramethylphosphonium hydroxide and tetraethylphosphonium hydroxide.

The quaternary ammonium compound here used can be preferably a quaternary ammonium salt (typically strong base) such as a tetraalkylammonium salt or a hydroxyalkyl trialkylammonium salt. The anion component in such a quaternary ammonium salt can be, for example, OH⁻, F⁻, Cl⁻, Br⁻, I⁻, $ClO^{4-}$, or $BH^{4-}$. In particular, preferable examples include a quaternary ammonium salt where the anion is OH—, namely, quaternary ammonium hydroxide. Specific examples of the quaternary ammonium hydroxide include tetraalkylammonium hydroxides such as tetramethylammonium hydroxide, tetraethylammonium hydroxide, tetrapropylammonium hydroxide, tetrabutylammonium hydroxide, tetrapentylammonium hydroxide and tetrahexylammonium hydroxide; and hydroxyalkyl trialkylammonium hydroxides such as 2-hydroxyethyltrimethylammonium hydroxide (also referred to as "choline").

Among these alkalis, for example, at least one alkali selected from alkali metal hydroxide, quaternary ammonium hydroxide and ammonia can be preferably used. In particular, a tetraalkylammonium hydroxide (for example, tetramethylammonium hydroxide) and ammonia are more preferable, and ammonia is particularly preferable.

According to one embodiment of the present invention, an alkali addition step of adding an alkali to the polyvinyl alcohol composition obtained through the addition-in-liquid step is further included. The polyvinyl alcohol composition in the present invention can be subjected to the alkali addition step and thus formed into an alkaline polyvinyl alcohol composition, and therefore the resulting composition can be preferably used as the polishing composition and/or the wetting agent for a semiconductor. The alkali addition step is preferably performed by mixing the polyvinyl alcohol composition obtained through the addition-in-liquid step, with a third liquid containing an alkali.

The acid herein refers to a compound which, when dissolved in water, serves to decrease the pH of an aqueous solution. The acid here used can be any of an inorganic acid or an organic acid. The inorganic acid is not particularly limited, and examples thereof include sulfuric acid, nitric acid, boric acid, carbonic acid, hypophosphorous acid, phosphorus acid, and phosphoric acid. The organic acid is not particularly limited, and examples thereof include carboxylic acids such as formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid and lactic acid, as well as methanesulfonic acid, ethanesulfonic acid, and isethionic acid. In particular, maleic acid or nitric acid is more preferable, and maleic acid is further preferable.

The content of the pH adjusting agent is not particularly limited, and may be appropriately selected so that the pH of each of a polyvinyl alcohol composition according to one mode of the present invention, a wetting agent for a semiconductor according to one mode of the present invention, and a polishing composition according to one mode of the present invention falls within a desired range.

In a case where the polishing composition and/or the wetting agent for a semiconductor disclosed herein contains an alkali, the concentration of the alkali in such a polishing liquid is not particularly limited. The concentration in the polishing liquid is usually preferably 0.001% by mass or more, more preferably 0.003% by mass or more (for example, 0.005% by mass or more) from the viewpoint of, for example, acting properties on a substrate surface. The concentration is properly less than 0.3% by mass, preferably less than 0.1% by mass, more preferably less than 0.05% by mass, particularly preferably less than 0.03% by mass (for example, less than 0.025% by mass, furthermore less than 0.01% by mass) from the viewpoint of, for example, a reduction in haze.

(Chelating Agent)

The polishing composition and/or the wetting agent for a semiconductor disclosed herein may further contain a chelating agent. The chelating agent may be used singly or in combinations of two or more kinds thereof. Examples of the chelating agent include an aminocarboxylic acid-based chelating agent and an organic phosphonic acid-based chelating agent. Suitable examples of the chelating agent include ethylenediaminetetrakis(methylenephosphonic acid), diethylenetriaminepenta(methylenephosphonic acid), and diethylenetriaminepentaacetic acid. Examples of the antiseptic agent and the antifungal agent include an isothiazoline-based compound, p-oxybenzoic acid esters, and phenoxyethanol.

(Organic Acid, Organic Acid Salt, Inorganic Acid, and Inorganic Acid Salt)

The polishing composition and/or the wetting agent for a semiconductor disclosed herein may further contain an organic acid and a salt thereof, and an inorganic acid and a salt thereof. The organic acid and the salt thereof, and the inorganic acid and the salt thereof can be each used singly or in combinations of two or more kinds thereof. Examples of the organic acid include aliphatic acids such as formic acid, acetic acid and propionic acid, aromatic carboxylic acids such as benzoic acid and phthalic acid, itaconic acid, citric acid, oxalic acid, tartaric acid, malic acid, maleic acid, fumaric acid, succinic acid, glycolic acid, malonic acid, gluconic acid, alanine, glycine, lactic acid, hydroxyethylidene diphosphoric acid (HEDP), organic sulfonic acids such as methanesulfonic acid, and organic phosphonic acids such as nitrilotris(methylenephosphoric acid) (NTMP) and phosphonobutane tricarboxylic acid (PBTC). Examples of the organic acid salt include alkali metal salts (sodium salt, potassium salt, and the like) and ammonium salts of the organic acid. Examples of the inorganic acid include hydrochloric acid, phosphoric acid, sulfuric acid, phosphonic acid, nitric acid, phosphinic acid, boric acid, and carbonic acid. Examples of the inorganic acid salt include alkali metal salts (sodium salt, potassium salt, and the like) and ammonium salts of the inorganic acid.

(Metal Anticorrosive)

The polishing composition and/or the wetting agent for a semiconductor disclosed herein may further contain a metal anticorrosive. Specific examples of the metal anticorrosive include nitrogen-containing heterocyclic ring compounds such as a pyrrole compound, a pyrazole compound, an imidazole compound, a triazole compound, a tetrazole compound, a pyridine compound, a pyrazine compound, a pyridazine compound, a pyrindine compound, an indolizine compound, an indole compound, an isoindole compound, an indazole compound, a purine compound, a quinolizine compound, a quinoline compound, an isoquinoline compound, a naphthyridine compound, a phthalazine compound, a quinoxaline compound, a quinazoline compound, a cinnoline compound, a buterizine compound, a triazole compound, an isothiazole compound, an oxazole compound, an isoxazole compound and a furazan compound. Such a metal anticorrosive may be used singly or in combinations of two or more kinds thereof.

(Oxidant)

The polishing composition and/or the wetting agent for a semiconductor disclosed herein may further contain an oxidant. Specific examples of the oxidant include peroxide, periodic acid, a periodic acid salt, a permanganic acid salt, a vanadic acid salt, a hypochlorous acid salt, iron oxide, and ozone. Specific examples of the peroxide include hydrogen peroxide, peracetic acid, a percarbonic acid salt, urea peroxide, perchloric acid and a perchloric acid salt, and persulfuric acid salts such as sodium persulfate, potassium persulfate and ammonium persulfate. Such an oxidant may be used singly or in combinations of two or more kinds thereof.

The polishing composition and/or the wetting agent for a semiconductor disclosed herein, when used for a substrate having a surface made of a silicon single crystal, preferably do/does not substantially contain the oxidant. The reason is because, if the oxidant is contained, a surface of a silicon substrate is oxidized to generate an oxide film, thereby sometimes leading to deterioration in acting properties on a substrate surface. The "not substantially contain the oxidant" here refers to at least no intended compounding of any oxidant, and unavoidable inclusion of a trace of any oxidant derived from a raw material or due to a production method or the like is acceptable. The trace means that the molar concentration of such any oxidant is 0.0005 mol/L or less (preferably 0.0001 mol/L or less, more preferably 0.00001 mol/L or less, particularly preferably 0.000001 mol/L or less). A polishing composition and/or a wetting agent for a semiconductor according to preferable one aspect do/does not contain the oxidant.

(Antiseptic Agent, Antifungal Agent)

The polishing composition and/or the wetting agent for a semiconductor disclosed herein may further contain an antiseptic agent and an antifungal agent. Specific examples of the antiseptic agent and the antifungal agent include isothiazoline-based antiseptic agents such as 2-methyl-4-isothiazolin-3-one and 5-chloro-2-methyl-4-isothiazolin-3-one, p-oxybenzoic acid esters, and phenoxyethanol. Such antiseptic agent and antifungal agent may be each used singly or in combinations of two or more kinds thereof.

(pH)

The pH of each of the polishing composition and/or the wetting agent for a semiconductor disclosed herein is not particularly limited. The pH is preferably 1.0 or more, more preferably 2.0 or more, typically 8.0 or more, preferably 8.5 or more, more preferably 9.0 or more, further preferably 9.3 or more, for example, 9.5 or more. In this regard, the pH of each of the polishing composition and/or the wetting agent for a semiconductor is properly 12.0 or less, preferably 11.0 or less, more preferably 10.8 or less, further preferably 10.5 or less.

The pH can be identified by performing three-point calibration by use of a pH meter (for example, a glass electrode-type hydrogen ion concentration indicator (Model No. F-23) manufactured by Horiba Ltd.) and a standard buffer (phthalate pH buffer, pH: 4.01 (25° C.), neutral phosphate pH buffer, pH: 6.86 (25° C.), carbonate pH buffer, pH: 10.01 (25° C.)), then placing the glass electrode in a composition of a measurement subject, and measuring a value after a lapse of 2 minutes or more for stabilization.

[Polishing Liquid and Rinsing Liquid]

The polishing composition disclosed herein can be supplied typically in the form of a polishing liquid containing the polishing composition, to a substrate, and used for polishing the substrate. The wetting agent for a semiconductor disclosed herein is supplied typically in the form of a rinsing liquid containing the wetting agent for a semiconductor, to a substrate, and then used for rinsing the substrate. The polishing liquid can be, for example, prepared by diluting (typically, diluting with water) any polishing composition disclosed herein. Alternatively, the polishing composition may be used as a polishing liquid, as it is. In other words, the concept of the polishing composition in the technique disclosed herein encompasses both a polishing liquid (working slurry) to be supplied to a substrate and used for polishing the substrate, and a concentrated liquid (namely, polishing liquid stock solution) to be diluted and used as a polishing liquid. The rinsing liquid can be, for example, prepared by diluting (typically, diluting with water) any wetting agent for a semiconductor disclosed herein. Alternatively, the wetting agent for a semiconductor may be used as a rinsing liquid, as it is. In other words, the concept of the wetting agent for a semiconductor in the technique disclosed herein encompasses both a rinsing liquid to be supplied to a substrate and used for rinsing the substrate, and a concentrated liquid (namely, rinsing liquid stock solution) to be diluted and used as a rinsing liquid. Other examples of the polishing liquid containing the polishing composition disclosed herein include a polishing liquid obtained by adjusting the pH of the composition. Other examples of the rinsing liquid containing the wetting agent for a semiconductor disclosed herein include a rinsing liquid obtained by adjusting the pH of the composition.

(Concentrate)

The polishing composition and/or the wetting agent for a semiconductor herein, before being supplied to the substrate, may be in a concentrated form before being supplied to the substrate. In other words, the polishing composition and/or the wetting agent for a semiconductor is in the form of concentrate of a polishing liquid and/or a rinsing liquid, and can also be identified as polishing liquid and/or rinsing liquid stock solution. Such polishing composition and/or wetting agent for a semiconductor in the form of concentrate has the advantages of convenience during production, distribution, storage, and the like, a reduction in cost, and the like. The concentration factor of such each concentrate is not particularly limited, and can be, for example, about twice to 100 times and is usually properly about 5-50 times (for example, about 10-40 times) in terms of volume.

Such a concentrate can be used in an aspect where a polishing liquid (working slurry) is prepared due to dilution at a desired timing and the polishing liquid is supplied to a substrate. The dilution can be performed by, for example, adding water to the concentrate and mixing them.

The content of the abrasive in the concentrate can be, for example, 50% by mass or less. The content of the abrasive in the concentrate is usually preferably 45% by mass or less, more preferably 40% by mass or less, further preferably 30% by mass or less, even more preferably 20% by mass or less (for example, 10% by mass or less) from the viewpoint of handling (for example, dispersion stability and filtration ability of the abrasive) of the concentrate. The content of the abrasive can be, for example, 0.5% by mass or more, and is preferably 1% by mass or more, more preferably 2% by mass or more, for example, 3% by mass or more from the viewpoints of convenience during production, distribution, storage, and the like, a reduction in cost, and the like. In preferable one aspect, the content of the abrasive may be 4% by mass or more, or may be 5% by mass or more.

[Preparation of Polishing Composition and Wetting Agent for Semiconductor]

The polishing composition for use in the technique here disclosed may be of one-agent type, or may be of multi-agent type, for example, two-agent type. For example, the polishing composition may be constituted so that a polishing liquid is prepared by mixing a part A containing at least the abrasive among constituent components of the polishing composition and a part B containing at least one portion of the remaining component, and, if necessary, mixing and diluting them at an appropriate timing. The wetting agent for a semiconductor for use in the technique here disclosed may be of one-agent type, or may be of multi-agent type, for example, two-agent type. For example, the wetting agent for a semiconductor may be constituted so that a rinsing liquid is prepared by mixing a part A containing at least the polyvinyl alcohol among constituent components of the wetting agent for a semiconductor and a part B containing at least one portion of the remaining component, and, if necessary, mixing and diluting them at an appropriate timing.

The method for preparing the polishing composition and/or the wetting agent for a semiconductor is not particularly limited. For example, components constituting the polishing composition and/or the wetting agent for a semiconductor may be mixed by use of a well-known mixing apparatus such as a blade-type stirrer, an ultrasonic disperser, or a homomixer. An aspect where these components are mixed is not particularly limited, and, for example, all the components may be mixed at one time or the components may be mixed in the order appropriately set. In one Example, the method for producing a polishing composition includes mixing the wetting agent for a semiconductor and the abrasive.

[Substrate]

A polishing composition and/or a wetting agent for a semiconductor according to one embodiment of the present invention can be applied to polishing and/or rinsing of any substrate having various materials and shapes. The material of such a substrate can be, for example, metal or metalloid such as silicon, aluminum, nickel, tungsten, copper, tantalum, titanium, hafnium, cobalt or stainless steel, or an alloy thereof; a glassy substance such as quartz glass, aluminosilicate glass or glassy carbon; a ceramic material such as alumina, silica, sapphire, silicon nitride, tantalum nitride or titanium carbide; a compound semiconductor substrate material such as silicon carbide, gallium nitride or gallium arsenide; or a resin material such as a polyimide resin. A substrate constituted from a plurality of such materials may also be adopted. A metal, a substrate having an oxygen atom and a silicon atom, a substrate having a silicon-silicon bond, a substrate having a nitrogen atom and a silicon atom, or the like may also be adopted. Examples of the substrate having an oxygen atom and a silicon atom include silicon oxide ($SiO_2$) and a tetraethyl orthosilicate (TEOS) polycondensate. Examples of the substrate having a silicon-silicon bond include polysilicon, amorphous silicon, single crystal silicon, n-type doped single crystal silicon, p-type doped single crystal silicon, and a Si-based alloy such as SiGe. Examples of the substrate having a nitrogen atom and a silicon atom include a substrate having a silicon-nitrogen bond, such as a silicon nitride film or SiCN (silicon carbonitride).

A polishing composition and/or a wetting agent for a semiconductor according to one embodiment of the present invention can be used in polishing and/or rinsing of a surface made of silicon, typically particularly preferably polishing and/or rinsing of a silicon wafer. A typical example of the silicon wafer here mentioned is a silicon single-crystal wafer, and is, for example, a silicon single-crystal wafer obtained by slicing of a silicon single-crystal ingot.

The polishing composition and/or the wetting agent for a semiconductor here disclosed can be preferably applied to a polishing step and/or a subsequent rinsing step of a substrate (for example, silicon wafer). The substrate may be subjected to common processing which can be applied to the substrate in a step upstream of a polishing step with the polishing composition and/or the wetting agent for a semiconductor here disclosed, for example, wrapping or etching, before the polishing step.

The polishing composition and/or the wetting agent for a semiconductor here disclosed can be preferably used in, for example, polishing and/or subsequent rinsing of a substrate (for example, silicon wafer) which is prepared in the upstream step so as to have a surface state having a surface roughness of 0.1-100 nm. The surface roughness Ra of the substrate can be measured with, for example, a laser scanning-type surface roughness meter "TMS-3000WRC" manufactured by Schmitt Measurement System Inc. Use in final polishing (final polishing) or immediately preceding polishing and subsequent rinsing is effective, and use in final polishing and subsequent rinsing is particularly preferable. The final polishing here refers to the last polishing step (namely, a step followed by no additional polishing thereafter performed) in a process for producing an object.

<Polishing and Rinsing>

The polishing composition disclosed herein can be used in, for example, polishing of a substrate, according to an aspect including the following operation. The wetting agent for a semiconductor disclosed herein can be used in, for example, rinsing of a substrate, according to an aspect including the following operation. Hereinafter, there is described one suitable aspect of the method for polishing a substrate (for example, silicon wafer) by use of the polishing composition disclosed herein and the method for rinsing a substrate (for example, silicon wafer) by use of the wetting agent for a semiconductor disclosed herein.

In other words, a polishing liquid containing any polishing composition disclosed herein is prepared. Such preparation of the polishing liquid can include preparation of the polishing liquid by subjecting such any polishing composition to operations such as concentration adjustment (for example, dilution) and pH adjustment. Alternatively, such any polishing composition may be used as the polishing liquid, as it is.

Next, the polishing liquid is supplied to a substrate, and the substrate is polished by an ordinary method. For example, in a case where final polishing of a silicon wafer is performed, typically a silicon wafer subjected to a wrapping step is installed in a common polishing apparatus and the polishing liquid is supplied through a polishing pad of the polishing apparatus, to a surface to be polished of the silicon wafer. Typically, while the polishing liquid is continuously supplied, the polishing pad is put onto the surface to be polished of the silicon wafer and both are relatively moved (for example, rotated and moved). Polishing of the substrate is completed through such a polishing step.

Subsequently, a rinsing liquid containing any wetting agent for a semiconductor disclosed herein is prepared. Such preparation of the rinsing liquid can include preparation of the rinsing liquid by subjecting such any wetting agent for a semiconductor to operations such as concentration adjustment (for example, dilution) and pH adjustment. Alternatively, the wetting agent for a semiconductor may be used as a rinsing liquid, as it is.

Next, the rinsing liquid is supplied to a substrate, and the polishing pad is put onto a surface polished of the silicon wafer and both are relatively moved (for example, rotated and moved) according to the same method as in the polishing. Rinsing of the substrate is completed through such a step.

(Polishing Pad)

The polishing pad for use in the polishing step and/or the rinsing step is not particularly limited. For example, a foamed polyurethane-type, or a non-woven cloth-type or suede-type polishing pad can be used. Such each polishing pad may contain an abrasive or may contain no abrasive. A polishing pad containing no abrasive is usually preferably used.

[Cleaning]

A substrate polished and/or rinsed by use of a polishing composition and/or a wetting agent for a semiconductor according to one embodiment of the present invention is typically cleaned. The cleaning can be performed by use of a proper cleaning liquid. The cleaning liquid here used is not particularly limited, and, for example, an SC-1 cleaning liquid or an SC-2 cleaning liquid commonly used in the semiconductor field or the like can be used. Examples of the SC-1 cleaning liquid include a mixed liquid of ammonium hydroxide (NH$_4$OH), hydrogen peroxide (H$_2$O$_2$) and water (H$_2$O). Examples of the SC-2 cleaning liquid include a mixed liquid of HCl, H$_2$O$_2$ and H$_2$O. The temperature of the cleaning liquid can be in the range from, for example, room temperature or more to about 90° C. or less. The room temperature is typically about 15° C.-25° C. A cleaning liquid at about 40° C.-85° C. can be preferably used from the viewpoint of an enhancement in cleaning effect.

EXAMPLES

The present invention is specifically described hereinafter with reference to Examples, but the present invention is not limited thereto. The expression "parts" is used herein in Examples, and represents "parts by mass" unless particularly noted. Each PVA in the following description is a saponified product of polyvinyl acetate.

(Preparation of Solution (1))

After 1200 parts of water at room temperature (25° C.) was added to a 3-L vessel, 600 parts of polyvinyl alcohol (PVA-124, manufactured by Kuraray Co., Ltd., degree of polymerization 2400, degree of saponification 98.0-99.0% by mol) was added (solid content concentration 3.3% by mass). The resultant was stirred at a speed of rotation of 250 rpm by use of a mechanical stirrer (manufactured by Shinto Scientific Co., Ltd., product name: Three-One Motor, Model No. BLh1200) with a propeller blade, the temperature was raised until the temperature of the solution in the vessel exceeded 90° C., and the polyvinyl alcohol was dispersed/swollen. Thereafter, the temperature was raised to 95° C. with stirring being continued, the stirring was continued for 1 hour with the temperature being kept to thereby allow the polyvinyl alcohol to be dissolved, and thus an aqueous polyvinyl alcohol solution was obtained.

Thereafter, the vessel where the aqueous polyvinyl alcohol solution was placed was immersed in a water bath and thus cooled. The aqueous polyvinyl alcohol solution was cooled in the water bath with being continuously stirred, and the cooling was terminated when the temperature of the aqueous polyvinyl alcohol solution reached 25° C. A time for about 30 minutes was taken for cooling from 95° C. to 25° C. Accordingly, the cooling rate here was calculated to be about 2° C./min. The aqueous polyvinyl alcohol solution obtained was adopted as solution (1).

[Addition Experiment]

An apparatus 10 illustrated in FIG. 1 was prepared in order to perform an addition experiment of solution (1). FIG. 1 is a view schematically illustrating an apparatus 10 used in an experiment of addition-in-liquid.

As illustrated in FIGS. 1, 21a and 21b (for example, by 900 parts) each representing solution (1) are respectively placed in beakers 11 and 12. One end of a tube 15a and one end of a tube 15b are connected respectively to the suction side and the discharge side of a pump 13. Other end of the tube 15a is immersed in solution (1) (21b) in the beaker 12, and other end of the tube 15b is immersed in solution (1) (21a) in the beaker 11. Thus, the pump 13 is configured to be operated to thereby directly add (addition-in-liquid) solution (1) (21b) in the beaker 12 into solution (1) (21a) in the beaker 11 via the tubes 15a and 15b. In the present experiment, both the first liquid and the second liquid each serve as solution (1).

Example 1

An experiment of addition of solution (1) obtained as above into a liquid by use of the apparatus 10 illustrated in FIG. 1 was performed. The beakers 11 and 12 were respectively loaded with 21a and 21b each representing solutions (1), by 900 parts. The sizes of the tubes 15a and 15b used were each 5 mm, the inner size of the beaker 11 (stirring vessel) was 20 cm, the speed of addition from solution (1) (21b) in the beaker 12 to solution (1) (21a) in the beaker 11 was 150-160 mL/min, and addition-in-liquid of solution (1) was performed for 5 minutes. No stirring was performed during the addition-in-liquid. After completion of the addition-in-liquid, the beaker 11 was subjected to stirring with Three-One Motor (apparatus) (not illustrated) (a number of rotations of 100 rpm). The temperature of solution (1) added by addition-in-liquid was 25° C., and stirring was performed without heating. The ratio (L/D) of the stirring blade size (L) to the inner size (D) of the stirring vessel was 0.5. After completion of the stirring, solution (1) (21a) in the beaker 11 was recovered, and adopted as polyvinyl alcohol composition (hereinafter, PVA composition) (1) of Example 1.

Comparative Example 1

Addition was performed by dropping in Comparative Example 1. Here, such an addition experiment by dropping was performed in the apparatus 10 illustrated in FIG. 1 by taking out other end of the tube 15b from solution (1) (21a) in the beaker 11 and placing it at 50-60 cm above the liquid surface of solution (1) (21a) (for example, retaining the tube 15b by a clamp or the like). The beakers 11 and 12 were respectively loaded with 21a and 21b each representing solutions (1), by 900 parts, the speed of addition from solution (1) (21b) in the beaker 12 to solution (1) (21a) in the beaker 11 was 150-160 mL/min, and addition of solution (1) by dropping was performed for 5 minutes. No stirring was performed during the liquid addition. After completion of the liquid addition, the beaker 11 was subjected to stirring with Three-One Motor (apparatus) (not illustrated) (a number of rotations of 100 rpm). The temperature of solution (1) added was 25° C., and stirring was performed without heating. After completion of the stirring, solution (1) (21a) in the beaker 11 and solution (1) (21b) in the beaker 12 were recovered together, and adopted for PVA composition (2) of Comparative Example 1.

Reference Example 1

Solution (1) (prepared and then left to still stand for 10 minutes) not subjected any addition experiment was adopted as PVA composition (3).

[Evaluation of Filtration Ability]

The filtration ability of each solution subjected to the addition experiment was evaluated. DIW correction was performed before evaluation of the filtration ability in order to eliminate the individual difference in filter. The DIW correction was to correct the difference in filtration ability between filters, with a coefficient, and the coefficient was calculated based on filtration performances (filtration time and filtrate amount) by use of deionized water.

Control

First, filtration of 600 g of deionized water at 25° C. was performed in each filter to be used. The material and the pore size of such each filter were respectively polypropylene and 0.2 μm. The filtration method was performed by vacuum filtration. The vacuum pressure in the filtration was 0.0125 MPa. The filtrate weight (g) at a filtration time of 100 seconds and at a filtration time of 600 seconds were measured. These filtrate weights (g) of deionized water were used for the DIW correction of each filter.

PVA Composition 600 g of each PVA composition (25° C.) obtained as above was filtered by vacuum filtration (vacuum pressure 0.0125 MPa) by use of the filter used in the Control. The amount of the filtrate was measured at an interval of 60 seconds. Table 1 showed the filtrate weight (g) of the filtrate with respect to such each PVA composition. Each value was a value subjected to DIW correction.

Filtrate Weight by DIW Correction (Calculation of DIW Correction Value with Respect to Each Evaluation Sample)

The average value was obtained by adding the filtrate weight after 100 seconds of filtration time in deionized water filtration and ⅙ of the filtrate weight after 600 seconds of filtration. The average value was determined as "filtrate weight (average value) after 100 seconds of filtration time". Specifically, for each filter used to evaluate the filtration performance of each evaluation sample (addition-in-liquid, drop addition, and solution left to still stand), the filtrate weight (average value) after 100 seconds of filtration time in deionized water filtration was calculated, and the filtrate weight (average value) after 100 seconds of filtration time in deionized water filtration was added to ⅙ of the filtrate weight after 600 seconds of filtration time in the evaluation sample using that filter, and thereby "the filtrate weight (average value) after 100 seconds of filtration time" was calculated. This is the "filtrate weight (average value) of each evaluation sample after 100 seconds of filtration time" in the following formula (1).

The average filtrate weight after 100 seconds of filtration time was calculated for all samples evaluated for filtration performance. In other words, "the average filtrate weight of all evaluation samples after 100 seconds of filtration time" is the average value (average value of all evaluation samples) of the filtrate weight in the filters that were used to evaluate the filtration of solutions obtained by addition-in-liquid, drop addition, and solution left to still stand.

Using the "the filtrate weight (average value) of each evaluation sample after 100 seconds of filtration time" and "the average filtrate weight of all evaluation samples after 100 seconds of filtration time" obtained above, the "DIW correction value" in the following formula (1) for each evaluation sample were calculated.

(Calculation of Filtrate Weight by DIW Correction)

The correction of filtrate weight based on deionized water for the filtration time in each evaluation sample was performed as follows using "DIW correction value of each evaluation samples". The results of filtrate weight (filtrate weight by DIW correction) performed "DIW correction value of each evaluation samples" at each filtration time (specified value) in each evaluation sample are shown in Table 1.

[Expression 1]

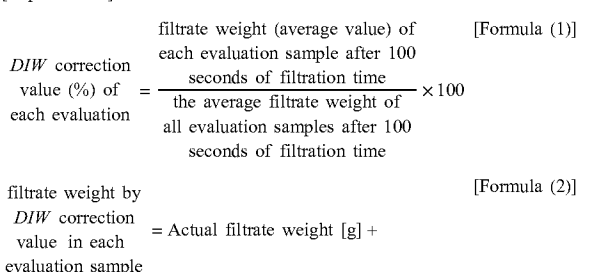

$$\text{DIW correction value (\%) of each evaluation} = \frac{\text{filtrate weight (average value) of each evaluation sample after 100 seconds of filtration time}}{\text{the average filtrate weight of all evaluation samples after 100 seconds of filtration time}} \times 100 \quad [\text{Formula (1)}]$$

$$\text{filtrate weight by DIW correction value in each evaluation sample} = \text{Actual filtrate weight [g]} + \quad [\text{Formula (2)}]$$

-continued $$\text{Actual filtrate weight [g]} \times \frac{(100 - DIW \text{ correction value (\%)} \text{ of each evaluation sample})}{100}$$

TABLE 1

| | Filtrate weight [g] | | |
|---|---|---|---|
| Filtration time [sec] | PVA composition (1) | PVA composition (2) | PVA composition (3) |
| Prescribed value | | DIW correction | |
| 0 | 0 | 0 | 0 |
| 60 | 193 | 27 | 169 |
| 120 | 348 | 30 | 312 |
| 180 | 486 | 32 | 442 |
| 240 | 604 | 33 | 565 |

*Evaluation of filtration ability of PVA composition*

It was found as shown in Table 1 that PVA composition (1) added into the inside of a liquid was remarkably favorable in filtration ability and was improved in filtration ability by such addition into the inside of a liquid, as compared with PVA composition (2) dropped and added. It was also found that PVA composition (1) added into a liquid was almost the same in filtration ability as that of PVA composition (3) not subjected to any addition-in-liquid step, but left to still stand. It was thus found that generation of an aggregate due to addition was remarkably suppressed in a case where addition-in-liquid was performed.

Therefore, it can be seen that a polishing composition and/or a wetting agent for a semiconductor, which contains PVA composition (1), can be used in polishing and/or rinsing of a substrate such as a silicon wafer to result in reduction of surface defects (for example, LPD: Light Point Defects) and a significant enhancement in surface quality of a substrate.

The present application is based on Japanese Patent Application No. 2020-164901 filed on Sep. 30, 2020, the disclosure of which is herein incorporated by reference in its entirety.

REFERENCE SIGNS LIST

10 experiment apparatus of addition-in-liquid,
11, 12 beaker,
13 pump,
15*a*, 15*b* tube,
21*a*, 21*b* solution (1).

The invention claimed is:

1. A method for producing a wetting agent for a semiconductor, containing a polyvinyl alcohol composition, wherein:

the polyvinyl alcohol composition is obtained through an addition-in-liquid step of adding into an inside of a first liquid containing polyvinyl alcohol and water a second liquid other than the first liquid, or adding the first liquid into an inside of the second liquid; and the addition-in-liquid step is carried out in a stirring vessel having a stirring blade, and a ratio (L/D) of a stirring blade diameter (L) to an inner diameter (D) of the stirring vessel is 0.1 or more and 0.9 or less.

2. The method for producing a wetting agent for a semiconductor according to claim 1, further comprising a filtration step of filtering the polyvinyl alcohol composition obtained through the addition-in-liquid step.

3. The method for producing a wetting agent for a semiconductor according to claim 1, wherein the first liquid is obtained by heating a polyvinyl alcohol dispersion liquid in which polyvinyl alcohol is dispersed in water, to 85-98° C. and then cooling the polyvinyl alcohol dispersion liquid to 15-50° C.

4. The method for producing a wetting agent for a semiconductor according to claim 1, wherein the addition-in-liquid step is a step of adding the first liquid into the second liquid retained in a vessel having a stirring tool.

5. The method for producing a wetting agent for a semiconductor according to claim 1, wherein a content of the polyvinyl alcohol in the polyvinyl alcohol composition in the addition-in-liquid step is 10% by mass or less based on a total mass of the polyvinyl alcohol composition.

6. The method for producing a wetting agent for a semiconductor according to claim 1, further comprising an alkali addition step of adding an alkali to the polyvinyl alcohol composition obtained through the addition-in-liquid step.

7. A polishing composition comprising a wetting agent for a semiconductor, produced by the production method according to claim 1, and an abrasive.

8. A method for producing a polishing composition, comprising mixing a wetting agent for a semiconductor, produced by the production method according to claim 1, and an abrasive.

9. The method for producing a wetting agent for a semiconductor according to claim 1, wherein the addition-in-liquid step is carried out by using a supply pipe with an inner size of 5 mm or more and 50 cm or less.

10. The method for producing a wetting agent for a semiconductor according to claim 1, wherein the addition-in-liquid step is carried out by using a supply pipe and the supply pipe is open toward the bottom of the stirring vessel.

11. The method for producing a wetting agent for a semiconductor according to claim 1, wherein a supply speed of adding in the addition-in-liquid step is 50 mL/min or more and 20 L/min or less.

12. A method for producing a polishing composition containing a polyvinyl alcohol composition, wherein:

the polyvinyl alcohol composition is obtained through an addition-in-liquid step of adding into an inside of a first liquid containing polyvinyl alcohol and water a second liquid other than the first liquid, or adding the first liquid into an inside of the second liquid; and the addition-in-liquid step is carried out in a stirring vessel having a stirring blade, and a ratio (L/D) of a stirring blade diameter (L) to an inner diameter (D) of the stirring vessel is 0.1 or more and 0.9 or less.

13. The method for producing a polishing composition according to claim 12, wherein the addition-in-liquid step is carried out by using a supply pipe with an inner size of 5 mm or more and 50 cm or less.

14. The method for producing a polishing composition according to claim 12, wherein the addition-in-liquid step is carried out by using a supply pipe and the supply pipe is open toward the bottom of the stirring vessel.

15. The method for producing a polishing composition according to claim 12, wherein a supply speed of adding in the addition-in-liquid step is 50 mL/min or more and 20 L/min or less.

\* \* \* \* \*